(12) United States Patent
Whitehead et al.

(10) Patent No.: US 7,899,075 B2
(45) Date of Patent: Mar. 1, 2011

(54) UPLINK TRANSPORT FORMAT SELECTION

(75) Inventors: Michael Whitehead, Farnham (GB); Simone Provvedi, Twickenham (GB)

(73) Assignee: Nokia Corporation, Espoo (FI)

( * ) Notice: Subject to any disclaimer, the term of this patent is extended or adjusted under 35 U.S.C. 154(b) by 95 days.

(21) Appl. No.: 12/150,819

(22) Filed: May 1, 2008

(65) Prior Publication Data

US 2008/0273463 A1 Nov. 6, 2008

Related U.S. Application Data

(60) Provisional application No. 60/915,236, filed on May 1, 2007.

(51) Int. Cl.
*H04B 7/208* (2006.01)
(52) U.S. Cl. ......... 370/444; 370/310; 370/329; 370/346; 370/431; 370/442; 370/443; 455/403; 455/450; 455/451; 455/452.1
(58) Field of Classification Search .................. 370/431, 370/444, 442, 443, 310, 329, 346; 455/403, 455/450, 451, 452.1
See application file for complete search history.

(56) References Cited

U.S. PATENT DOCUMENTS

| 6,707,859 | B1 | 3/2004 | Kinnunen et al. | 375/316 |
|---|---|---|---|---|
| 6,944,178 | B1 | 9/2005 | Charriere et al. | 370/444 |
| 6,983,166 | B2 | 1/2006 | Shiu et al. | 455/522 |
| 7,200,135 | B2 | 4/2007 | Choi et al. | 370/348 |
| 2004/0008659 | A1 | 1/2004 | Kim | 370/342 |
| 2004/0174850 | A1 | 9/2004 | Vimpari et al. | 370/335 |
| 2004/0185892 | A1 | 9/2004 | Iacono et al. | 455/522 |
| 2005/0136919 | A1 | 6/2005 | Park et al. | 455/432.3 |
| 2005/0190719 | A1 | 9/2005 | Lee et al. | 370/328 |
| 2005/0237932 | A1 | 10/2005 | Liu | 370/230 |

(Continued)

FOREIGN PATENT DOCUMENTS

EP 1 748 593 1/2007

(Continued)

OTHER PUBLICATIONS

3GPP TS 25.321 V6.12.0 (Mar. 2007), 3rd Generation Partnership Project; Technical Specification Group Radio Access Network; Medium Access Control (MAC) protocol specification (Release 6).*

(Continued)

*Primary Examiner* — Pankaj Kumar
*Assistant Examiner* — Gautam Sharma
(74) *Attorney, Agent, or Firm* — Harrington & Smith

(57) ABSTRACT

A method includes performing transport format combination selection so as to maximize transmission of higher priority data. The method operates, when scheduled and/or non-scheduled grants are taken into account for a transmission time interval, giving data of a given priority belonging to a scheduled MAC-d flow precedence over any lower priority data, whether belonging to a scheduled or a non-scheduled MAC-d flow; and giving data of a given priority belonging to a non-scheduled MAC-d flow precedence over any lower priority data, whether belonging to a scheduled or a non-scheduled MAC-d flow. In the method, where if the transmission contains any scheduled data, the size of a selected MAC-e protocol data unit is made not to exceed the total of all non-scheduled grants which are applicable for transmission in the transmission time interval; a maximum number of scheduled bits based on a serving grant, after adjustment for compressed frames, and a power offset; and the size of triggered scheduling information, if any. Also disclosed are corresponding apparatus and computer programs.

22 Claims, 21 Drawing Sheets

U.S. PATENT DOCUMENTS

| | | | |
|---|---|---|---|
| 2006/0003733 A1 | 1/2006 | Chun et al. | 455/403 |
| 2006/0062193 A1 | 3/2006 | Choi et al. | 370/342 |
| 2006/0146833 A1 | 7/2006 | Roberts et al. | 370/395.42 |
| 2006/0187844 A1 | 8/2006 | Chun et al. | 370/242 |
| 2006/0268884 A1 | 11/2006 | Terry et al. | 370/394 |
| 2006/0268938 A1* | 11/2006 | Terry | 370/477 |
| 2007/0025300 A1 | 2/2007 | Terry et al. | 370/355 |
| 2007/0140261 A1 | 6/2007 | Wang et al. | 370/395.42 |
| 2007/0155335 A1* | 7/2007 | Love et al. | 455/69 |
| 2007/0189235 A1 | 8/2007 | Chandra et al. | 370/335 |
| 2008/0069035 A1* | 3/2008 | Pinheiro et al. | 370/328 |
| 2009/0034487 A1* | 2/2009 | Lohr et al. | 370/335 |

FOREIGN PATENT DOCUMENTS

| WO | WO-2006/118831 A2 | 11/2006 |
|---|---|---|

OTHER PUBLICATIONS

High Speed Uplink Packet Access (HSUPA) White Paper, Rohde and Schwarz, Jan. 3, 2006.*

"Universal Mobile Telecommunications System (UMTS); Medium Access Control (MAC) protocol specification (3GPP TS 25.321 version 6.12.0 Release 6); ETSI TS 125 321" ETSI Standards, LIS Sophia Antipolis Cedex, France, vol. 3-R2, No. V6.12.0, Mar. 1, 2007, XP014037913 ISSN: 0000-0001 cited in the application section 11.8.1.4.

3GPP TS 25.321 V6.12.0, "Medium Access Control (MAC) protocol specification (Release 6), Sec. 11.8.1.4", Mar. 2007, 3 pgs.

* cited by examiner

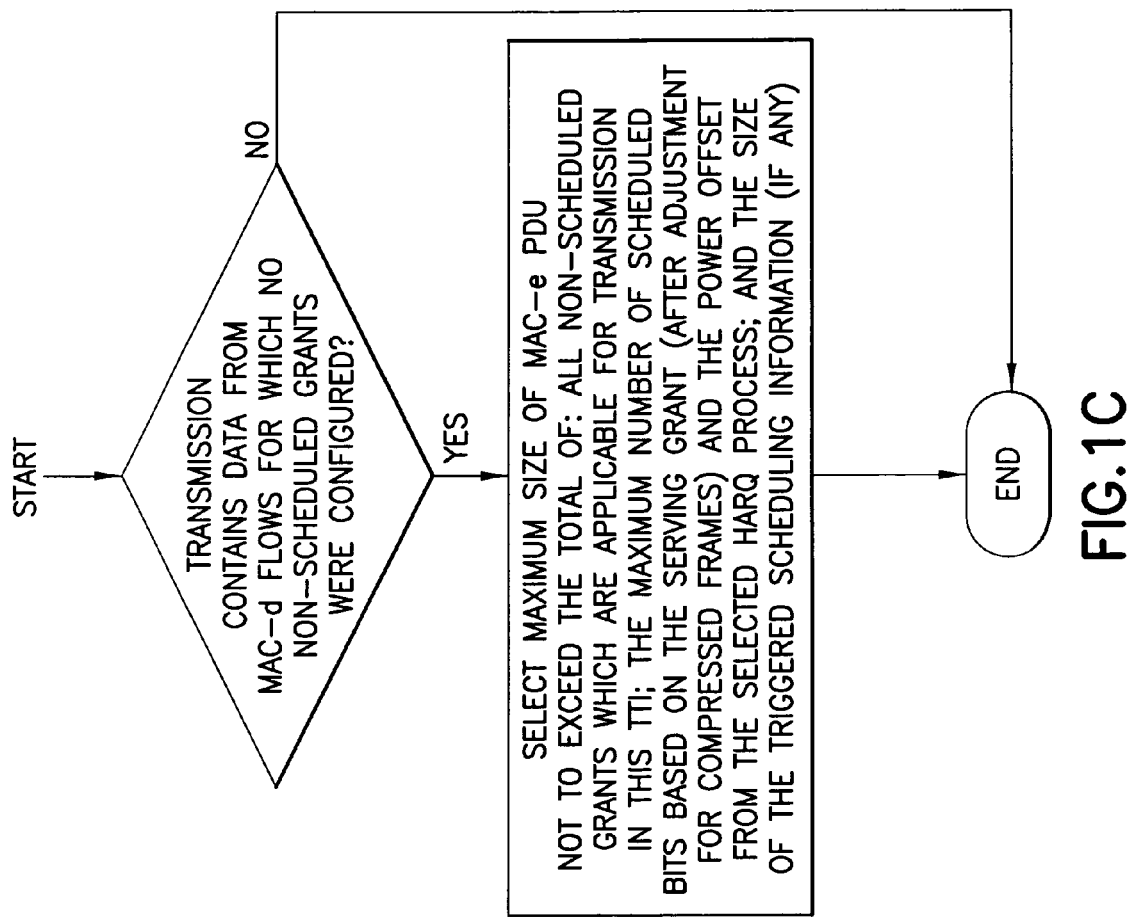

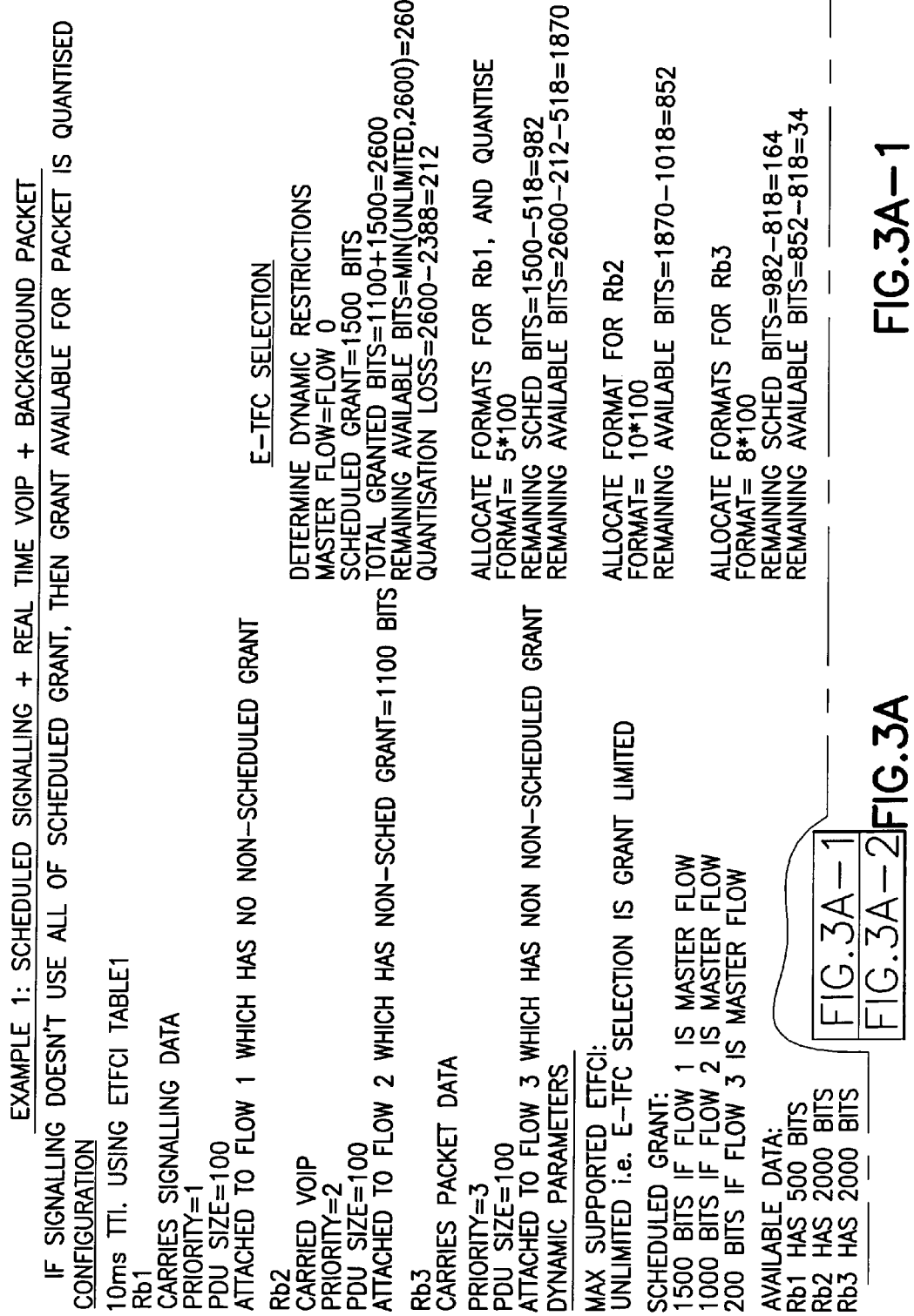

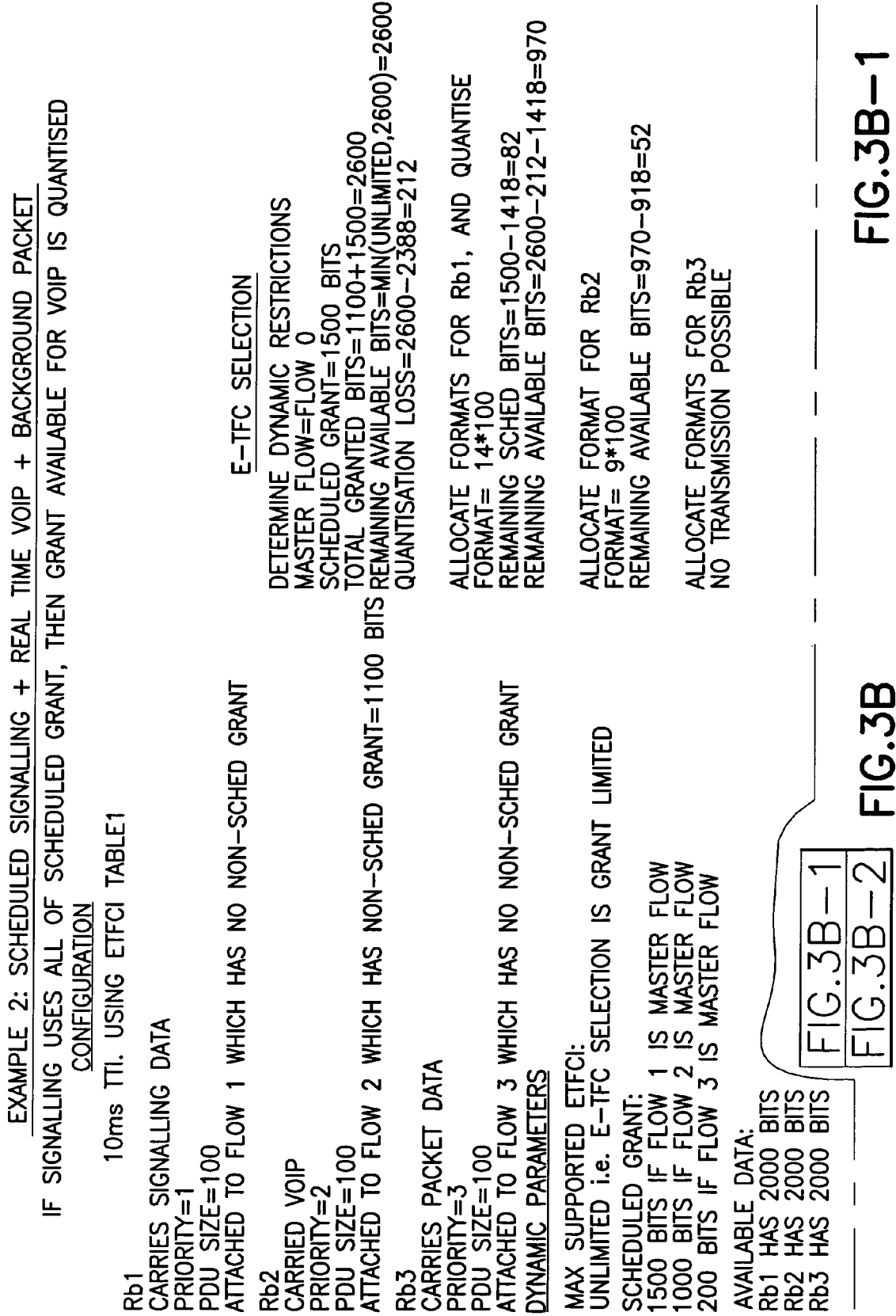

EXAMPLE 3: NON-SCHEDULED SIGNALLING + REAL TIME VOIP + BACKGROUND PACKET
IF SIGNALLING AND VOIP USE ALL OF THEIR SCHEDULED GRANTS, THEN GRANT AVAILABLE FOR PACKET IS QUANTISED
CONFIGURATION

10ms TTI. USING ETFCI TABLE1
Rb1
CARRIES SIGNALLING DATA
PRIORITY=1
PDU SIZE=100
ATTACHED TO FLOW 1 WHICH HAS NO NON-SCHED GRANT=500 BITS

Rb2
CARRIED VOIP
PRIORITY=2
PDU SIZE=100
ATTACHED TO FLOW 2 WHICH HAS NON-SCHED GRANT=600 BITS

Rb3
CARRIES PACKET DATA
PRIORITY=3
PDU SIZE=100
ATTACHED TO FLOW 3 WHICH HAS NON NON-SCHEDULED GRANT

DYNAMIC PARAMETERS
MAX SUPPORTED ETFCI:
UNLIMITED i.e. E-TFC SELECTION IS GRANT LIMITED

SCHEDULED GRANT:
1600 BITS IF FLOW 1 IS MASTER FLOW
1000 BITS IF FLOW 2 IS MASTER FLOW
200 BITS IF FLOW 3 IS MASTER FLOW

AVAILABLE DATA:
Rb1 HAS 2000 BITS
Rb2 HAS 2000 BITS
Rb3 HAS 2000 BITS

E-TFC SELECTION

DETERMINE DYNAMIC RESTRICTIONS
MASTER FLOW=FLOW 0
SCHEDULED GRANT=1500 BITS
TOTAL GRANTED BITS=1100+1600=2700
REMAINING AVAILABLE BITS=MIN(UNLIMITED,2700)=2700
QUANTISATION LOSS=2700-2388=312

ALLOCATE FORMAT FOR Rb1
FORMAT= 4*100
REMAINING NS BITS FOR THIS FLOW=500-418=82
REMAINING AVAILABLE BITS=2700-418=2282

ALLOCATE FORMAT FOR Rb2
FORMAT= 5*100
REMAINING NS BITS FOR THIS FLOW=600-518=82
REMAINING AVAILABLE BITS=2282-518=1764

QUANTISE & ALLOCATE FORMATS FOR Rb3
FORMAT= 14*100
REMAINING SCHED BITS=1600-1418=182
REMAINING AVAILABLE BITS=1764-312-1418=34

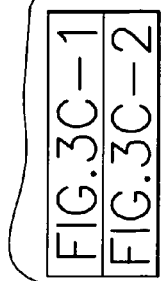

UPLINK TRANSPORT FORMAT SELECTION

CLAIM OF PRIORITY FROM COPENDING PROVISIONAL PATENT APPLICATION

This patent application claims priority under 35 U.S.C. §119(e) from Provisional Patent Application No. 60/915,236, filed May 1, 2007, the disclosure of which is incorporated by reference herein in its entirety.

TECHNICAL FIELD

The exemplary and non-limiting embodiments of this invention relate generally to wireless communication systems, methods, devices and computer programs and, more specifically, relate to transport channel signaling and control.

BACKGROUND

Various abbreviations that may appear in the ensuing description and/or in the drawing figures are defined as follows:

| | |
|---|---|
| 3GPP | third generation partnership project |
| HARQ | hybrid automatic repeat request |
| DL | downlink |
| UL | uplink |
| PHY | physical (layer 1) |
| DPCH | dedicated physical channel |
| HSUPA | high-speed uplink packet access |
| MAC | medium access control |
| RLC | radio link control |
| RNC | radio network controller |
| TTI | transmission time interval |
| DTCH | dedicated traffic channel |
| DCCH | dedicated control channel |
| DCH | dedicated channel |
| E-DCH | enhanced dedicated transport channel |
| E-TFC | enhanced transport format combination |
| FP | frame protocol |
| PDU | protocol data unit |
| UE | user equipment |
| Node B | base station |
| TNL | transport network layer |
| UMTS | universal mobile telecommunication system |
| UTRAN | UMTS terrestrial radio access network |
| MSC | mobile switching center |
| VLR | visitor location register |
| SGSN | serving gateway support node |
| VoIP | voice over interne protocol |

Radio communication systems provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features.

One area of effort involves transport format combination selection. Namely, improper selection can result in inefficient data transmissions. This is particularly of importance when data of differing priorities need to be handled, resulting in greater complexity in the associated hardware (e.g., user equipment) and software.

Therefore, there is a need for an approach for providing efficient transport format combination selection, which can co-exist with already developed standards and protocols.

SUMMARY

The foregoing and other problems are overcome, and other advantages are realized, by the use of the exemplary embodiments of this invention.

In a first aspect thereof the exemplary embodiments of this invention provide a method that includes performing transport format combination selection so as to maximize transmission of higher priority data. The method comprises, when scheduled and/or non-scheduled grants are taken into account for a transmission time interval, giving data of a given priority belonging to a scheduled MAC-d flow precedence over any lower priority data, whether belonging to a scheduled or a non-scheduled MAC-d flow; and giving data of a given priority belonging to a non-scheduled MAC-d flow precedence over any lower priority data, whether belonging to a scheduled or a non-scheduled MAC-d flow. In the method, where if the transmission contains any scheduled data, the size of a selected MAC-e protocol data unit is made not to exceed the total of all non-scheduled grants which are applicable for transmission in the transmission time interval; a maximum number of scheduled bits based on a serving grant, after adjustment for compressed frames, and a power offset; and the size of triggered scheduling information, if any.

In a further aspect thereof the exemplary embodiments of this invention provide an apparatus that comprises a controller configured to perform transport format combination selection so as to maximize transmission of higher priority data. The controller is further configured, when scheduled and/or non-scheduled grants are taken into account for a transmission time interval, to give data of a given priority belonging to a scheduled MAC-d flow precedence over any lower priority data, whether belonging to a scheduled or a non-scheduled MAC-d flow; and to give data of a given priority belonging to a non-scheduled MAC-d flow precedence over any lower priority data, whether belonging to a scheduled or a non-scheduled MAC-d flow. The controller is further configured, where the transmission contains any scheduled data, to make the size of a selected MAC-e protocol data unit not to exceed a total of: all non-scheduled grants which are applicable for transmission in the transmission time interval; a maximum number of scheduled bits based on a serving grant, after adjustment for compressed frames, and a power offset; and the size of triggered scheduling information, if any.

In a still further aspect thereof the exemplary embodiments of this invention provide an apparatus that includes means for performing transport format combination selection so as to maximize transmission of higher priority data. The performing means comprises means, responsive to when scheduled and/or non-scheduled grants are taken into account for a transmission time interval, for giving data of a given priority belonging to a scheduled MAC-d flow precedence over any lower priority data, whether belonging to a scheduled or a non-scheduled MAC-d flow, and for giving data of a given priority belonging to a non-scheduled MAC-d flow precedence over any lower priority data, whether belonging to a scheduled or a non-scheduled MAC-d flow. If the transmission contains any scheduled data, the size of a selected MAC-e protocol data unit is made not to exceed the total of all non-scheduled grants which are applicable for transmission in the transmission time interval; a maximum number of scheduled bits based on a serving grant, after adjustment for compressed frames, and a power offset from a HARQ profile; and the size of triggered scheduling information, if any.

In yet another aspect the exemplary embodiments of this invention provide a memory medium that stores computer program instructions, the execution of which results in operations that comprise performing transport format combination selection so as to maximize transmission of higher priority data by, when scheduled and/or non-scheduled grants are taken into account for a transmission time interval, giving data of a given priority belonging to a scheduled MAC-d flow precedence over any lower priority data, whether belonging to a scheduled or a non-scheduled MAC-d flow; and giving data of a given priority belonging to a non-scheduled MAC-d flow precedence over any lower priority data, whether belonging to a scheduled or a non-scheduled MAC-d flow. In these operations, if the transmission contains any scheduled data, the size of a selected MAC-e protocol data unit is made so as not to exceed the total of all non-scheduled grants which are applicable for transmission in the transmission time interval; a maximum number of scheduled bits based on a serving grant, after adjustment for compressed frames, and a power offset; and the size of triggered scheduling information, if any.

BRIEF DESCRIPTION OF THE DRAWINGS

In the attached Drawing Figures:

FIGS. 1C-1E are flowcharts of processes for transport format combination selection, according to various embodiments of the invention;

DETAILED DESCRIPTION

Figure 1A:
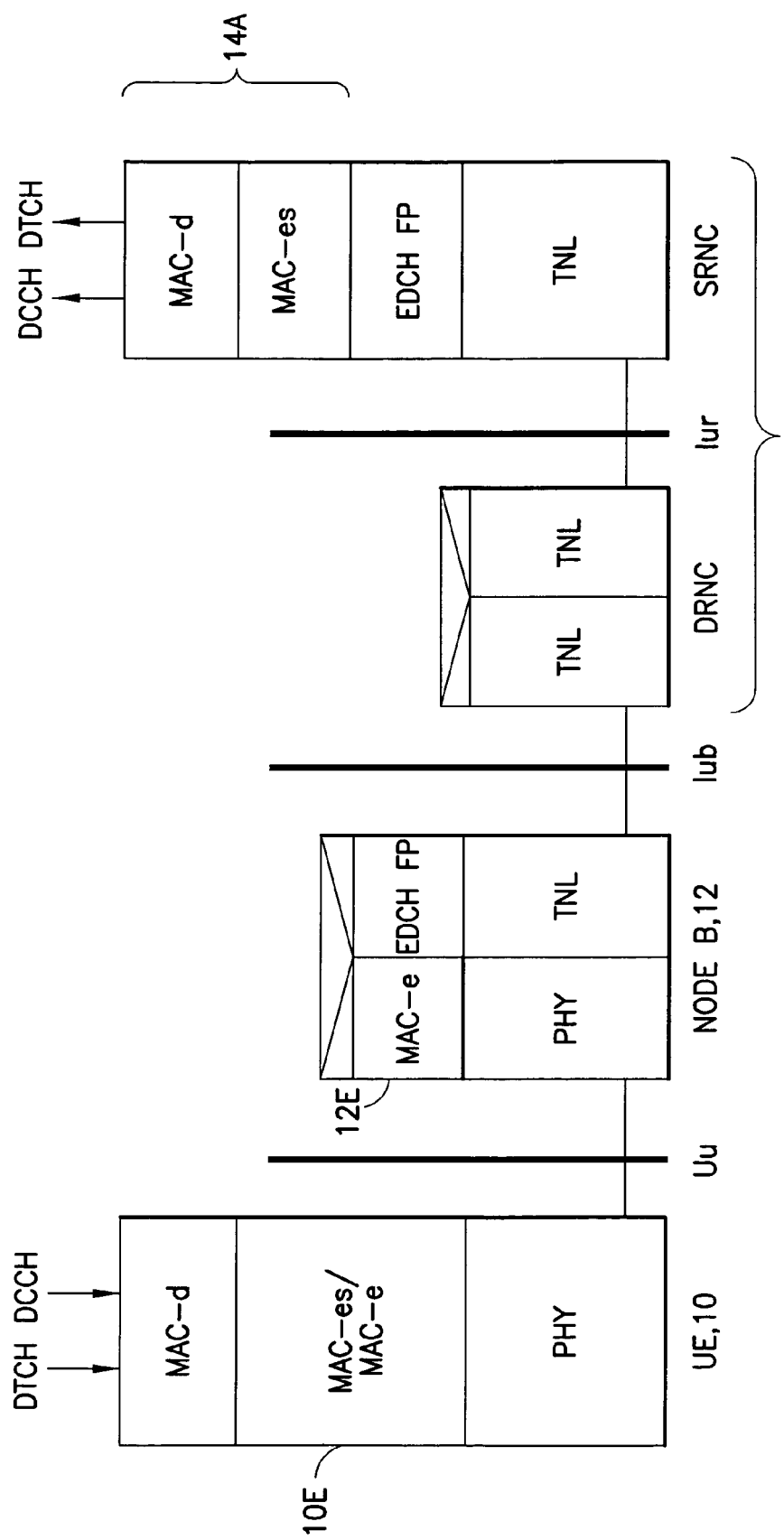
FIG. 1A is a diagram of a protocol architecture capable of providing selection of transport format combinations, that can be utilized according to an exemplary embodiment of the invention.
Figure 2A:
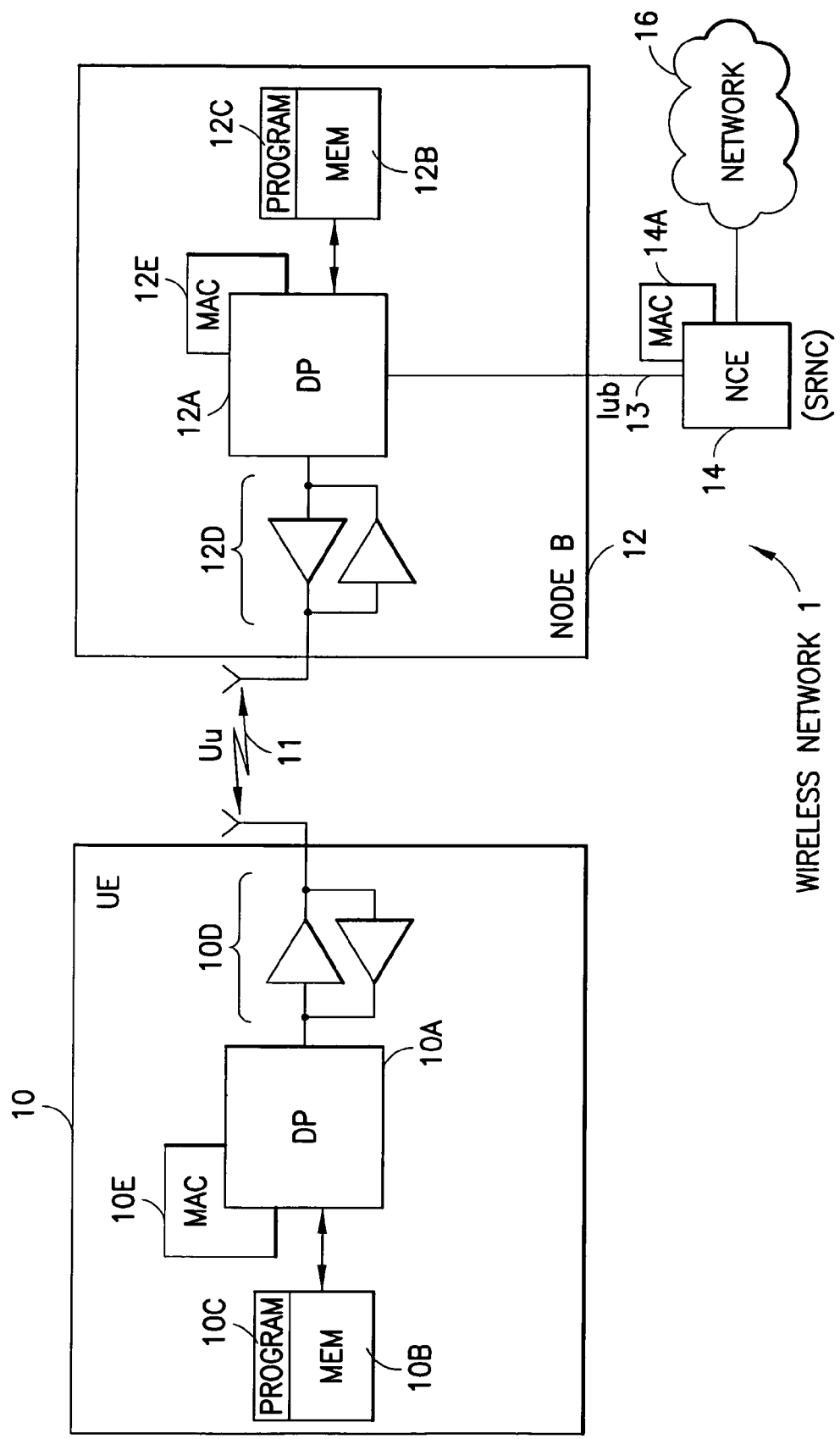
FIGS. 2A, 2B are simplified block diagrams of a communication system and associated architecture capable of supporting selection of transport format combinations, that may be utilized according to various exemplary embodiments of the invention.
Figure 2B:
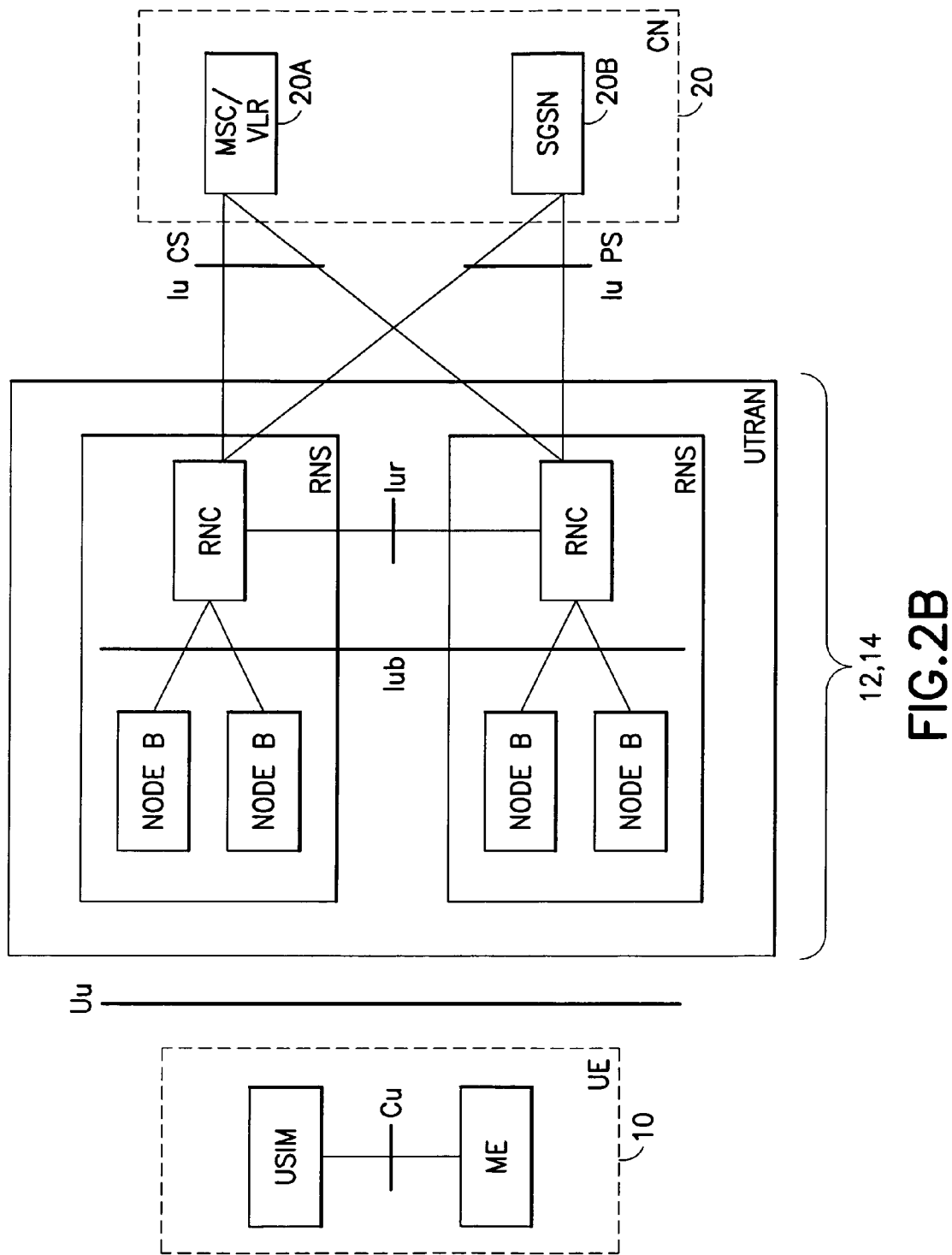

Reference is made first to FIGS. 2A and 2B for illustrating a simplified block diagram of various electronic devices that are suitable for use in practicing the exemplary embodiments of this invention. In FIG. 2A a wireless network 1 is adapted for communication with an apparatus 10, also referred to herein for convenience as a UE 10, via another apparatus, such as a network access node, also referred to herein for convenience as a Node B 12. The network 1 may include a network control element (NCE) 14 that may include at least one radio network controller (RNC), such as a drift RNC (DRNC) that provides connectivity with, via an Iur interface, a serving RNC (SRNC) (see also FIG. 1A). The UE 10 includes a data processor (DP) 10A, a memory (MEM) 10B that stores a program (PROG) 10C, and a suitable radio frequency (RF) transceiver 10D for bidirectional wireless communications 11 with the Node B 12 via a Uu interface. The Node B 12 also includes a DP 12A, a MEM 12B that stores a PROG 12C, and a suitable RF transceiver 12D. The Node B 12 is coupled via a data path 13, which may be implemented as an Iub interface (see FIG. 1A), to the NCE 14. The NCE 14 provides connectivity with one or more external networks 16 (e.g., telecommunication networks, TCP/IP networks, etc.) typically via a core network (CN) functionality 20 (shown in FIG. 2B).

The Node B 12 may utilize a Multiple Input Multiple Output (MIMO) antenna system; for instance, the Node B 32 can provide two antenna transmit and receive capabilities. This arrangement supports the parallel transmission of independent data streams to achieve high data rates. The Node B 12 and the UE 10 may communicate using Wideband Code Division Multiple Access (WCDMA), Orthogonal Frequency Division Multiplexing (OFDM) or Single Carrier Frequency Division Multiple Access (FDMA) (SC-FDMA). In an exemplary and non-limiting embodiment, both the UL and the DL can utilize WCDMA.

At least the PROG 10C is assumed to include program instructions that, when executed by the associated DP 10A, enable the electronic device to operate in accordance with the exemplary embodiments of this invention, as will be discussed below in greater detail. In general, the exemplary embodiments of this invention may be implemented at least in part by computer software executable by the DP 10A of the UE 10, or by hardware, or by a combination of software and hardware (and firmware). The DP 10A may be considered to be or to function as a controller of the UE 10, either alone or in combination with one or more other data processors or other logic circuitry.

Typically there will be a plurality of UEs 10 serviced by the Node B 12. The UEs 10 may or may not be identically constructed, but in general are all assumed to be electrically and logically compatible with the relevant network protocols and standards needed for operation in the wireless network 1. For the purposes of describing these exemplary embodiments the UE 10 is assumed to include a MAC entity or unit or function 10E, and a corresponding and compatible MAC entity or unit or function 12E is present in the Node B. The MAC 10E includes a MAC-d (data) and a MAC-e and MAC-es functionality, as shown in FIG. 1A. Corresponding MAC functionality 14A can be found in the NCE 14, such as in the SRNC, also as shown in FIG. 1A.

In general, an UMTS network (as in FIG. 2B) includes three interacting domains: a Core Network (CN) 20, UMTS Terrestrial Radio Access Network (UTRAN) that includes the Node Bs 12 and RNCs 14, and the UEs 10. The core network 20 may provide such functions as switching, routing and transit for user traffic, and can include a MSC/NVLR entity 20A for handling circuit switched (CS) traffic and a SGSN 20B for handling packet switched (PS) traffic. The UTRAN 30 provides the air interface access method for the UE 10. The control equipment for Node Bs 12 is referred to as the RNCs 14.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A, 12A may be of any type suitable to the local technical environment, and may include one or more of general purpose computers, special purpose computers, microprocessors, digital signal processors (DSPs) and processors based on a multicore processor architecture, as non limiting examples.

Disclosed herein are apparatus, method, and computer program(s) for selection of transport format combinations. In the following description, for the purposes of explanation, numerous specific details are set forth in order to provide a thorough understanding of the embodiments of the invention. It should be realized, however, that the exemplary embodiments of the invention may be practiced without the use of all of the disclosed specific details. In other instances various structures and devices are shown in block diagram form in order to avoid unnecessarily obscuring the embodiments of the invention.

Although the exemplary embodiments of the invention are discussed at least in part with respect to a communication network having a Universal Mobile Telecommunications System (UTMS) architecture, it should be realized that the exemplary embodiments of the invention have applicability to other types of communication systems having similar or equivalent functional capabilities.

FIG. 1A is a diagram of a protocol architecture capable of providing selection of transport format combinations, and that is suitable for use with the exemplary embodiments of the invention. For the purposes of illustration the exemplary embodiments are described with respect to UMTS systems, in particular Enhanced Dedicated Transport Channel (E-DCH) data transmission. In this example the MAC entity 10E, i.e. MAC-es/MAC-e, is deployed within the UE 10 and is located below MAC-d. The MAC-es/MAC-e in the UE 10 handles HARQ retransmissions (rapid retransmissions of erroneously received data packets between the UE 10 and the Node B 12, scheduling and MAC-e multiplexing, and E-DCH TFC (Transport Format Combination) selection. The MAC entity (MAC-e) can also be employed in the Node B 12, which handles HARQ retransmission, scheduling and MAC-e demultiplexing.

Figure 1B:
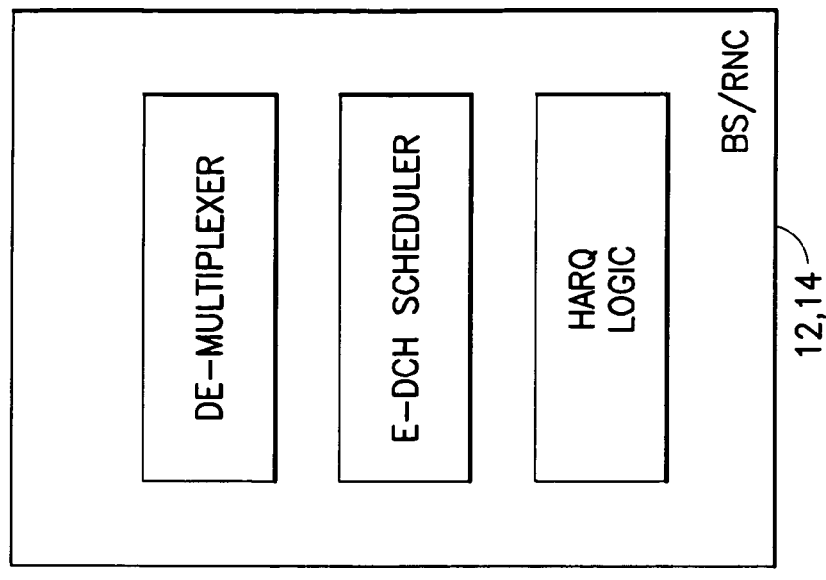
FIG. 1B is a diagram of a communication system including a user equipment and a base station for transport format combination selection, that can be utilized according to an exemplary embodiment of the invention.
Figure 1B:
Figure 1B:
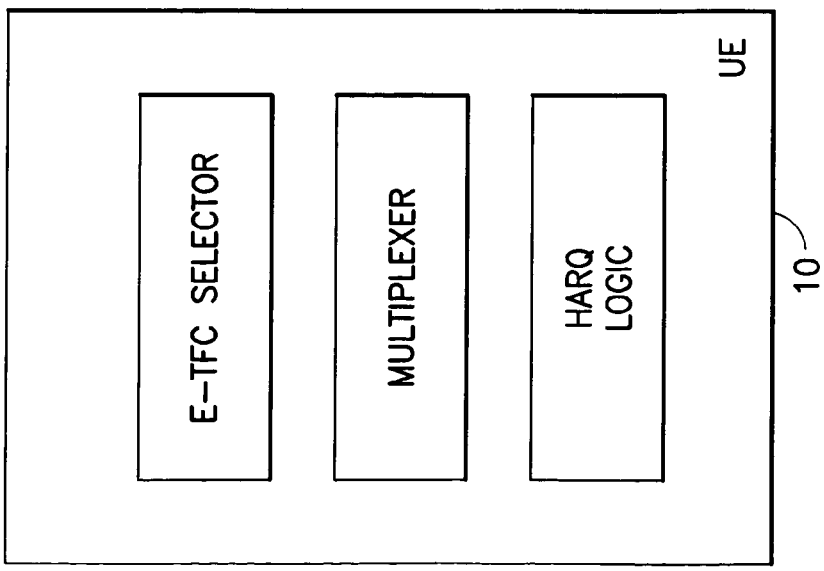

In FIG. 1B this exemplary system can possess an architecture that is compliant with the UMTS Terrestrial Radio Access Network (UTRAN). There may also be some similarity with Evolved-UTRAN (also known as Long Term Evolution (LTE)), although the exemplary embodiments of this invention are described most particularly (but not as a limitation) in the context of UTRAN E-DCH (HSUPA).

E-TFC can be used to determine how much data can be sent during one TTI (e.g., 10 ms or 2 ms). The UE 10 can restrict the list of E-TFCs available for transmission and/or re-transmission of data based on bit rate limitation, which comes from a Node B 12 scheduler in the form of, for example, an absolute or a relative grant based on transmission power resources. The UE 10 can select the most suitable E-TFC in order to use the available resources and respect the priority of the data to be sent.

Traditional approaches for E-TFC selection (e.g., as specified by 3GPP) have lead to a complex UE 10 implementation, and in some cases do not guarantee that the transmission of the higher priority data takes precedence over the transmission of the lower priority data. In particular, a network that seeks to configure high priority signaling as scheduled data in order to save bandwidth has no guarantees about the time of transmission of the signaling. In a case of bad radio conditions this could mean that the higher priority signaling could be blocked indefinitely, resulting in the call being dropped.

More specifically, conventional 3GPP systems require that the data from MAC-d flows are to be quantized to the next smaller supported E-TFC. Depending on the network configurations, this requirement could conflict with the general principle of E-TFC selection requirement, which requires the MAC to choose the data to be sent in a way that maximizes the transmission of higher priority data. In other words, the conventional E-TFC selection does not always work on priority, i.e., the UE 10 fills in the MAC-es PDU for each logical channel giving precedence to higher priority data. However, it is recognized that quantization operates on scheduled/non-scheduled data, disregarding the priority of the data. As a result, the UE may be requested to cut-off the scheduled data in the selected E-TFC independently of prioritization, leading to a potentially adverse delay in the delivery of higher priority data.

The above described scenario can create a problem in certain cases, whereby some higher priority scheduled data is systematically delayed in order to allow the transmission of lower priority non-scheduled data. Because of this approach, the data transmission of higher priority data can be blocked for (potentially) an indefinite amount of time. In particular, in a case where the network configures signaling on higher priority scheduled data, this situation can result in undesired consequences, such as dropping of the call.

A prior method to perform E-TFC selection, data multiplexing in MAC-e PDU and data quantization is defined in 3GPP TS 25.321, V6.12.0 (2007-03), 3rd Generation Partnership Project; Technical Specification Group Radio Access Network; Medium Access Control (MAC) protocol specification (Release 6), in section 11.8.1.4 and Annex C.

Figure 1D:
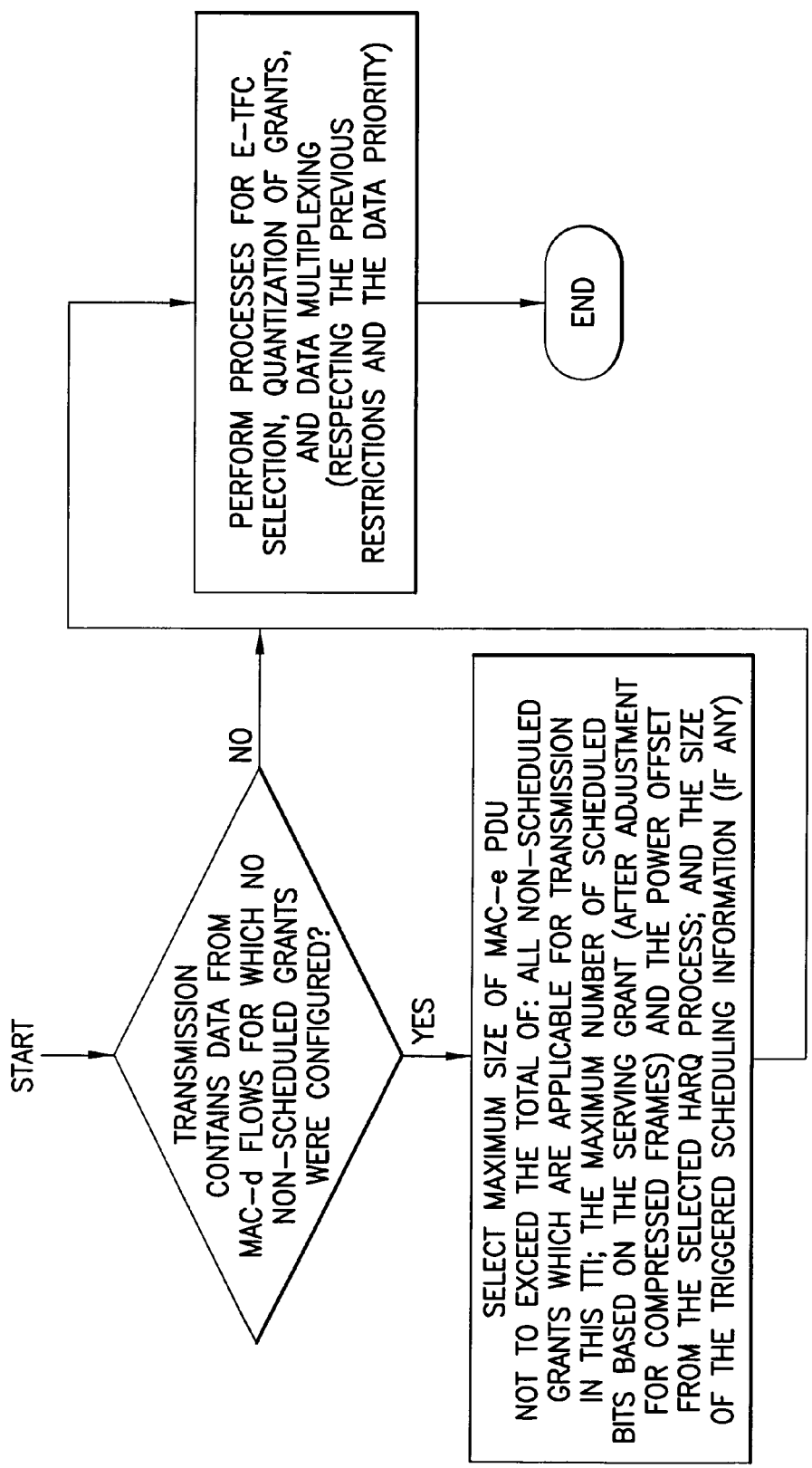
Figure 1E:
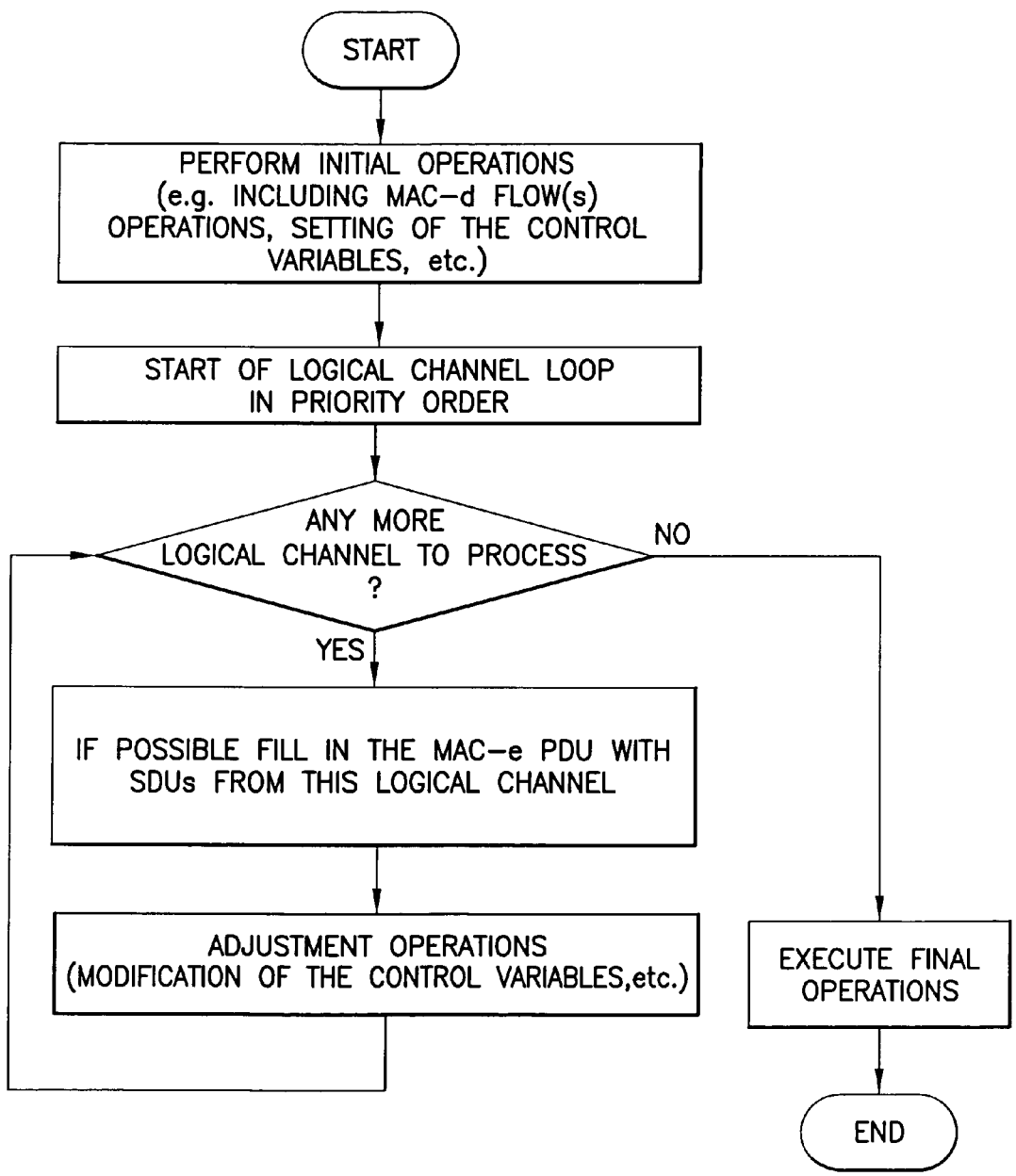

FIGS. 1C-1E are flowcharts of processes for transport format combination selection, according to various exemplary embodiments of this invention. According to one embodiment, an approach is provided to perform E-TFC selection, quantization of grants and data multiplexing in MAC-e PDUs in a way that a configured priority of data is preserved. Such an approach allows a simpler UE implementation and gives freedom to the wireless communication network to confidently configure signaling on scheduled data.

According to this method, while performing the E-TFC function:

If the transmission contains any data from MAC-d flows for which no non-scheduled grants were configured, the maximum size of the selected MAC-e PDU is quantized to the next smaller supported E-TFC based on amplitude ratios prior to the quantization, a Serving Grant (after adjustment for compressed frames), the power offset from a selected HARQ profile, the non-scheduled grants (if any) and Scheduling Information (if any).

The above approach can be restated as follows:

If the transmission contains any data from MAC-d flows for which no non-scheduled grants were configured, the size of the selected MAC-e PDU shall not exceed the total of: all non-scheduled grants which are applicable for transmission in this TTI; the maximum number of scheduled bits based on the Serving Grant (after adjustment for compressed frames) and the power offset from the selected HARQ process; and the size of the triggered scheduling information (if any).

In an alternative exemplary embodiment, the above process can be modified such that only low-priority scheduled data may potentially be lost due to quantization. This approach has the effect of preserving non-scheduled data in most scenarios of interest.

According to this alternative exemplary embodiment, while performing the E-TFC selection function:

If the transmission contains no data from MAC-d flows for which non-scheduled grants were configured, or If the transmission contains data from MAC-d flows for which non-scheduled grants were configured and also contains data from MAC-d flows for which no non-scheduled grants were configured, and if the relative priority of any such scheduled data is lower than the priority of all non-scheduled data in the MAC-e PDU, the maximum size of the selected MAC-e PDU is quantized to the next smaller supported E-TFC based on amplitude ratios prior to the quantization, the Serving Grant (after adjustment for compressed frames), the power offset from the selected HARQ profile, the non-scheduled grants (if any) and Scheduling Information (if any).

The above process can be rephrased as follows:

If the transmission contains no data from MAC-d flows for which non-scheduled grants were configured, or If the transmission contains data from MAC-d flows for which non-scheduled grants were configured and also contains data from MAC-d flows for which no non-scheduled grants were configured, and if the relative priority of any such scheduled data is lower than the priority of all non-scheduled data in the MAC-e PDU, the size of the selected MAC-e PDU shall not exceed the total of: all non-scheduled grants which are applicable for transmission in this TTI; the maximum number of scheduled bits based on the Serving Grant (after adjustment for compressed frames) and the power offset from the selected HARQ process; and the size of the triggered scheduling information (if any).

According to the various exemplary and non-limiting embodiments of this invention, the communication system shown variously in FIGS. 1A, 1B, 2A and 2B utilizes an architecture compliant with UTRAN, and can perform E-TFC selection, quantization of grants and data multiplexing in MAC-e PDUs as described herein.

Figures 2, 3A:
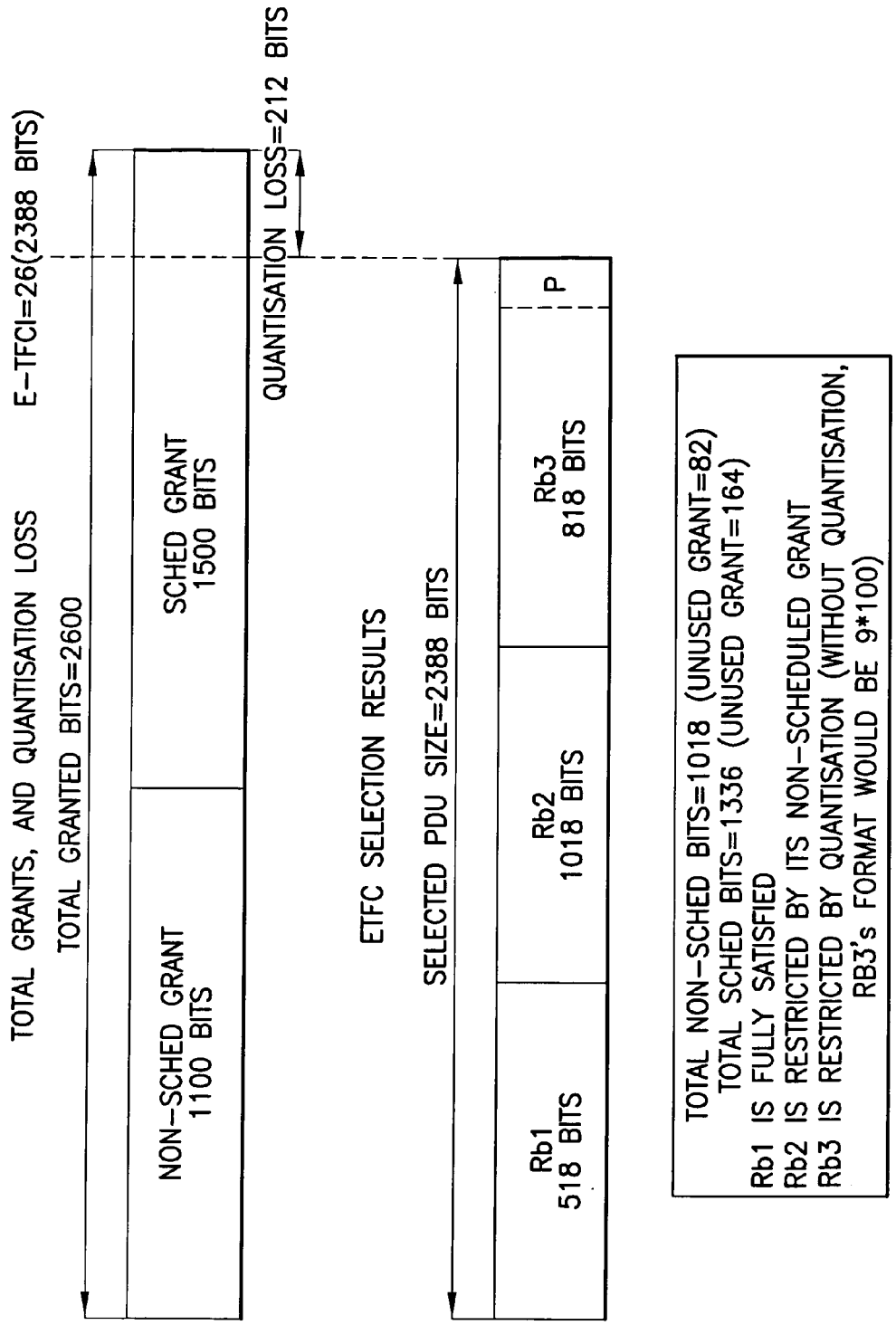
FIGS. 3A-3C are diagrams of exemplary E-DCH (Enhanced Dedicated Transport Channel) transport format combination selections, that may be utilized according to various exemplary embodiments of the invention.
Figures 2, 3B:
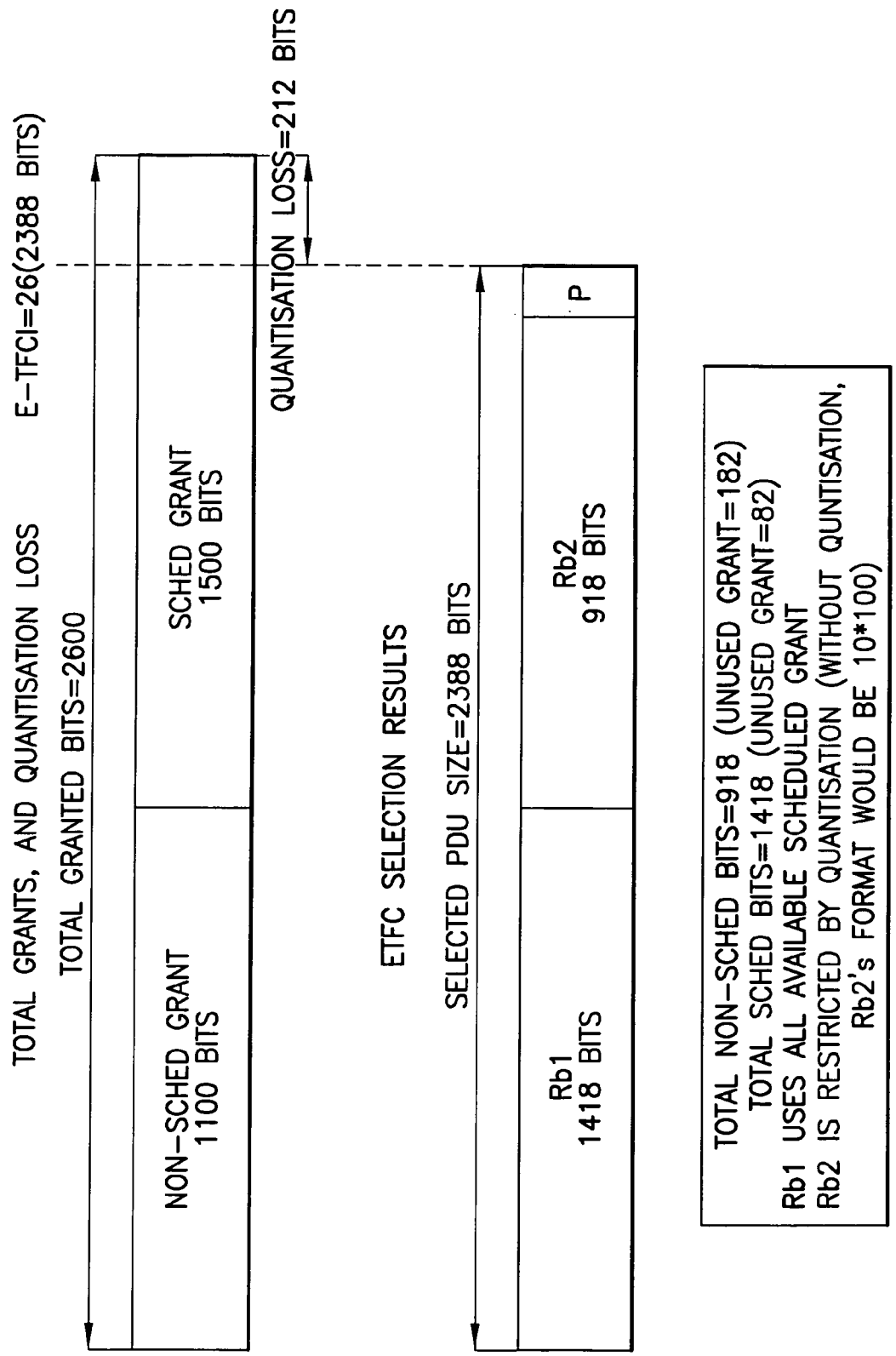
Figures 2, 3C:
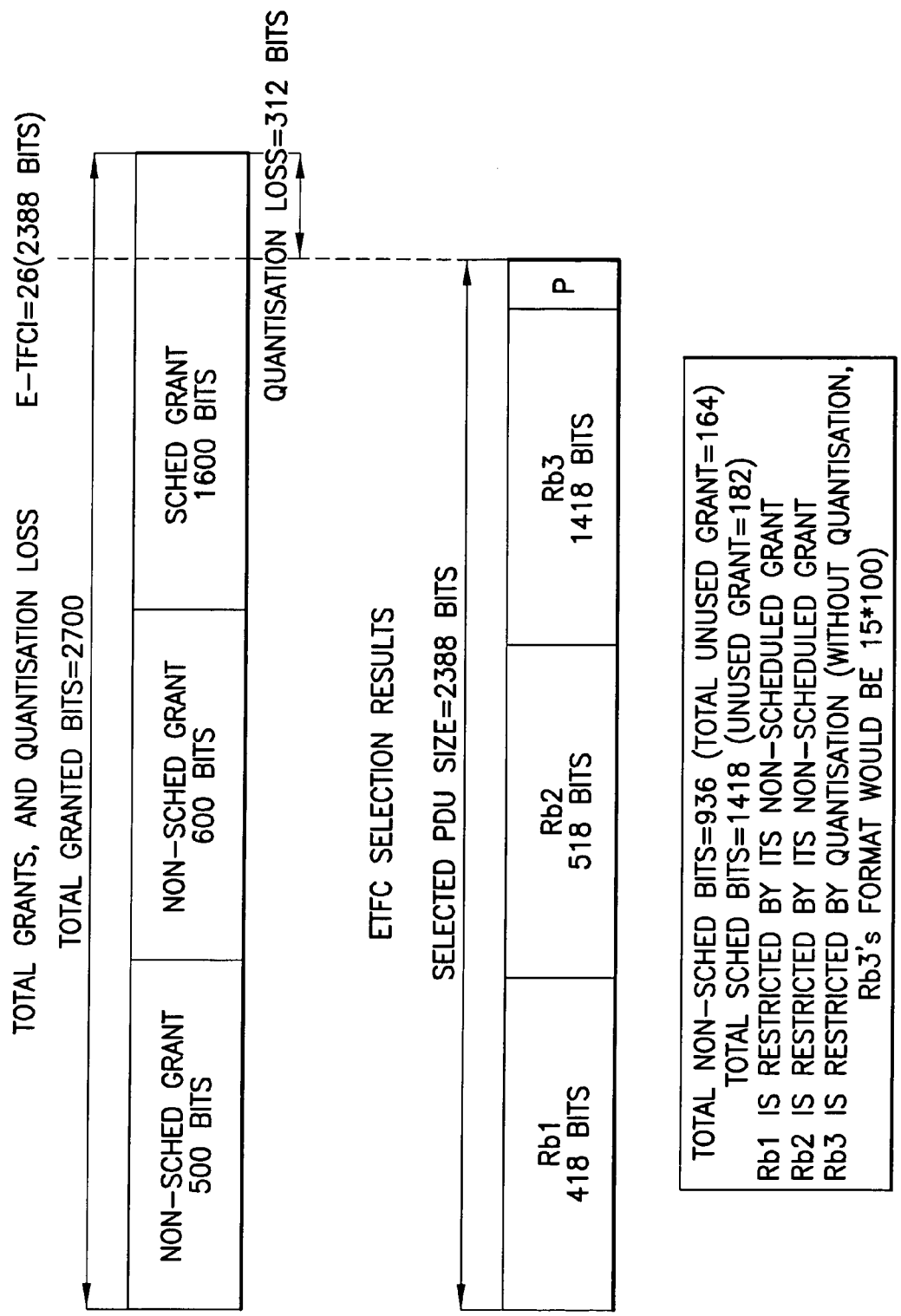
Figure 4A:
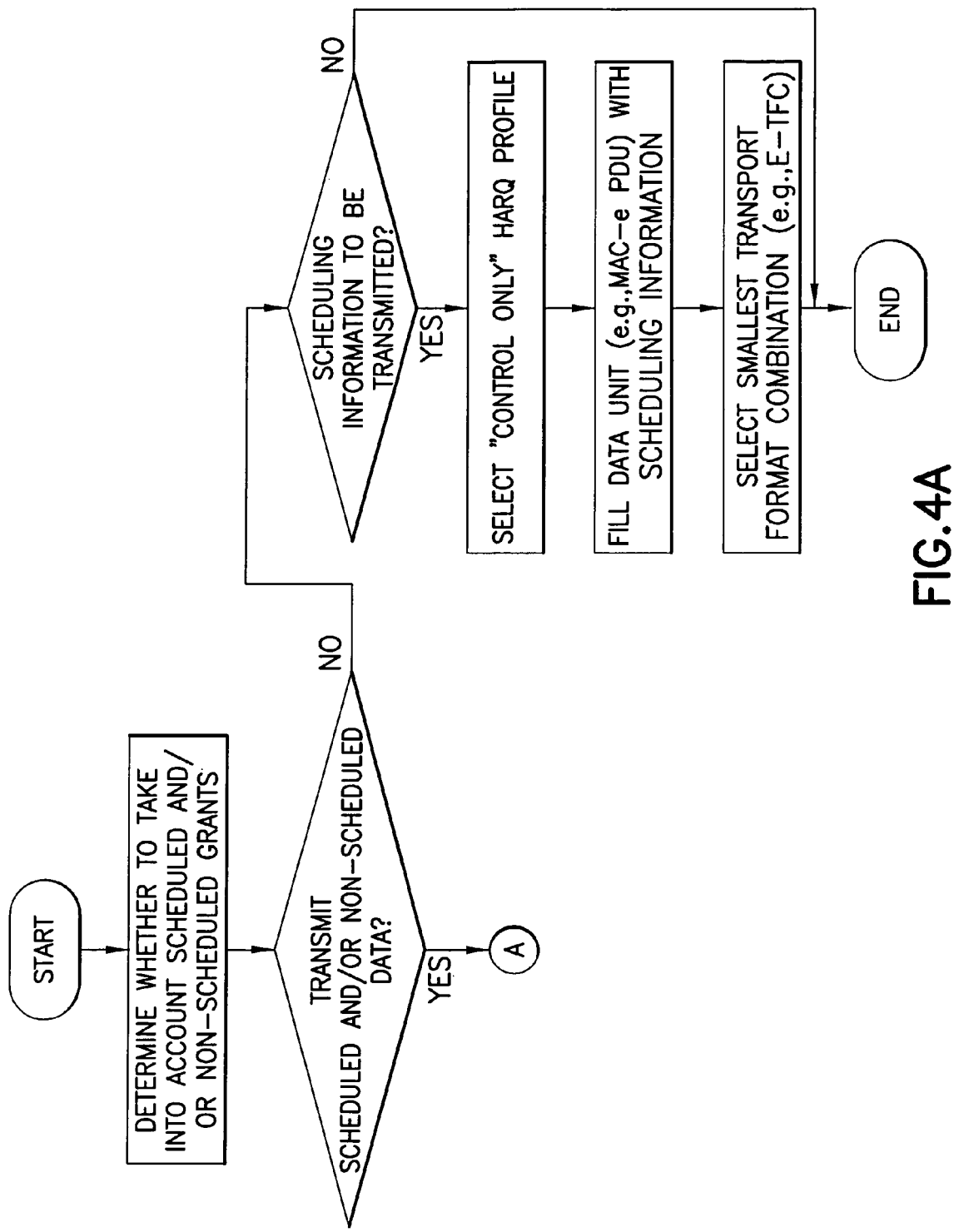
FIGS. 4A-4G are flowcharts of processes for E-TFC selection, quantization of grants, and data multiplexing, according to various exemplary embodiments of the invention.
Figure 4B:
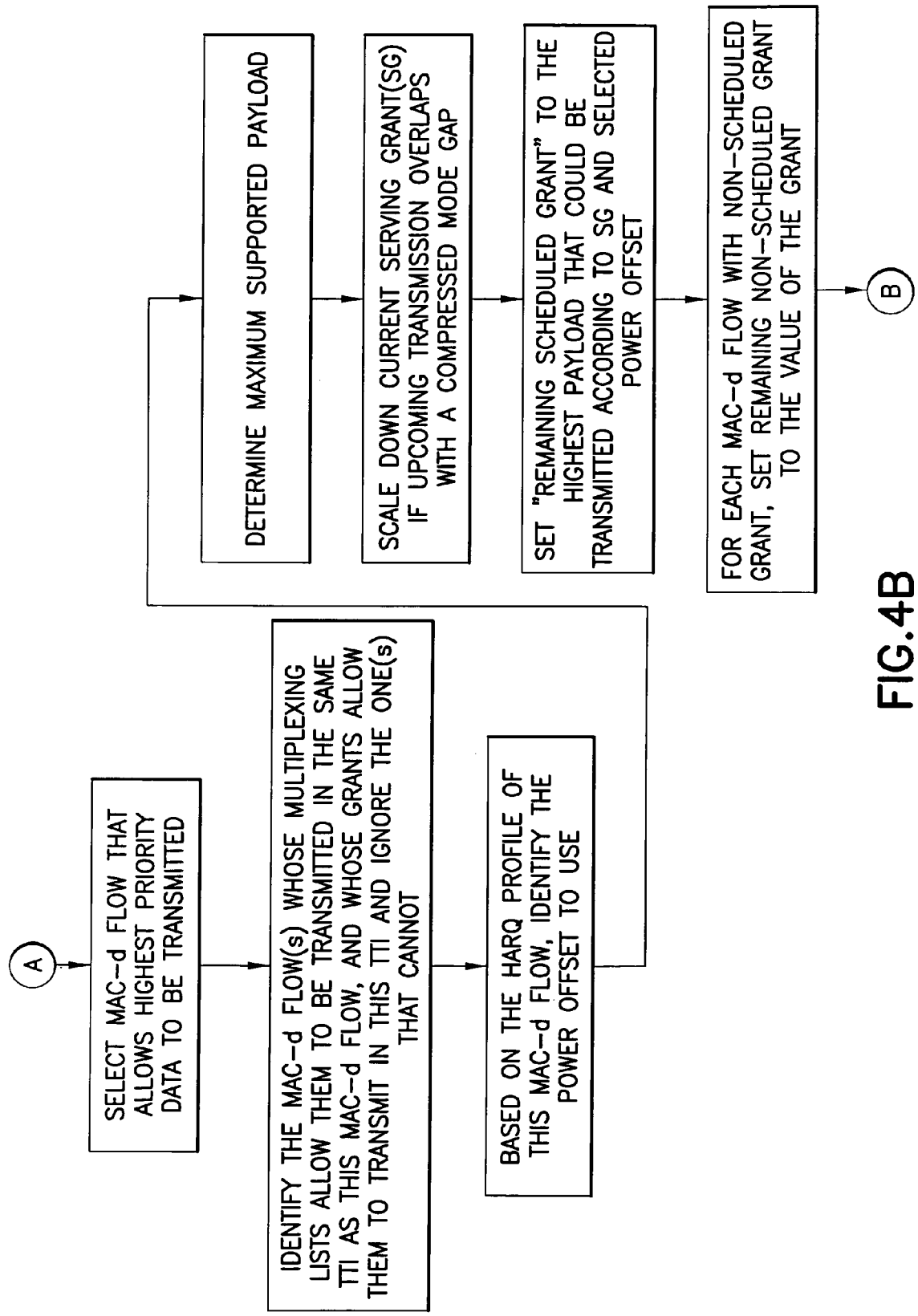
Figure 4C:
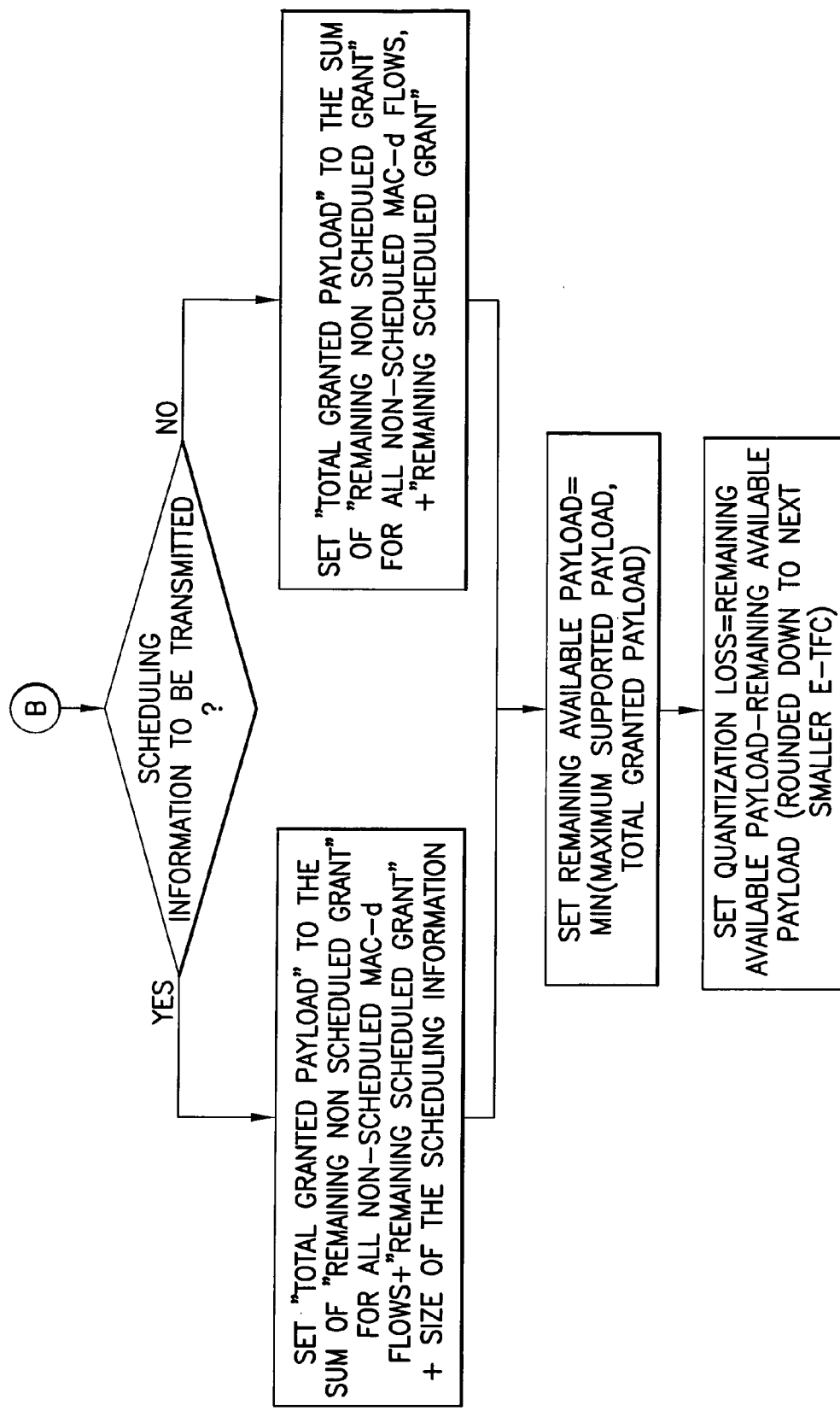
Figure 4D:
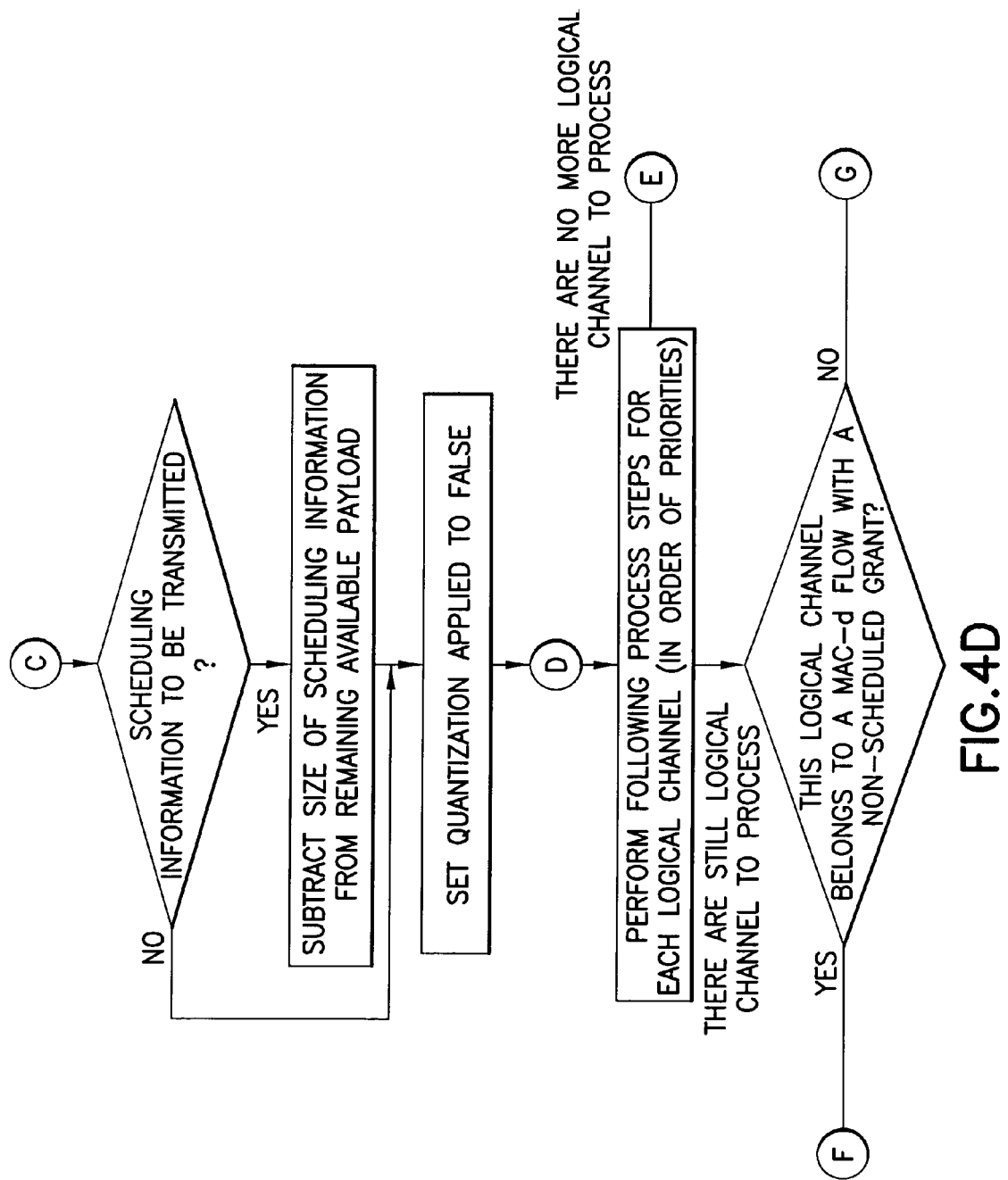
Figure 4E:
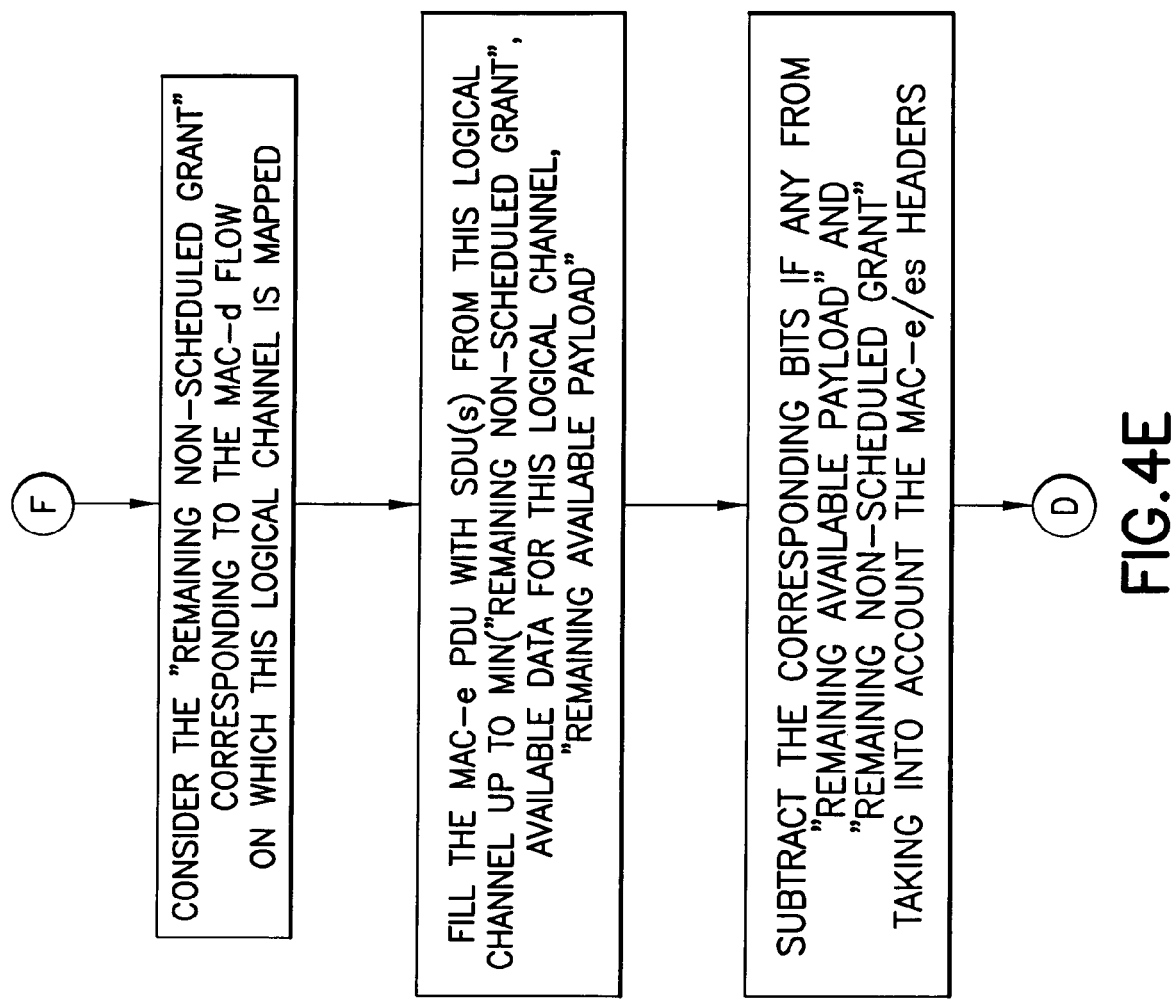
Figure 4F:
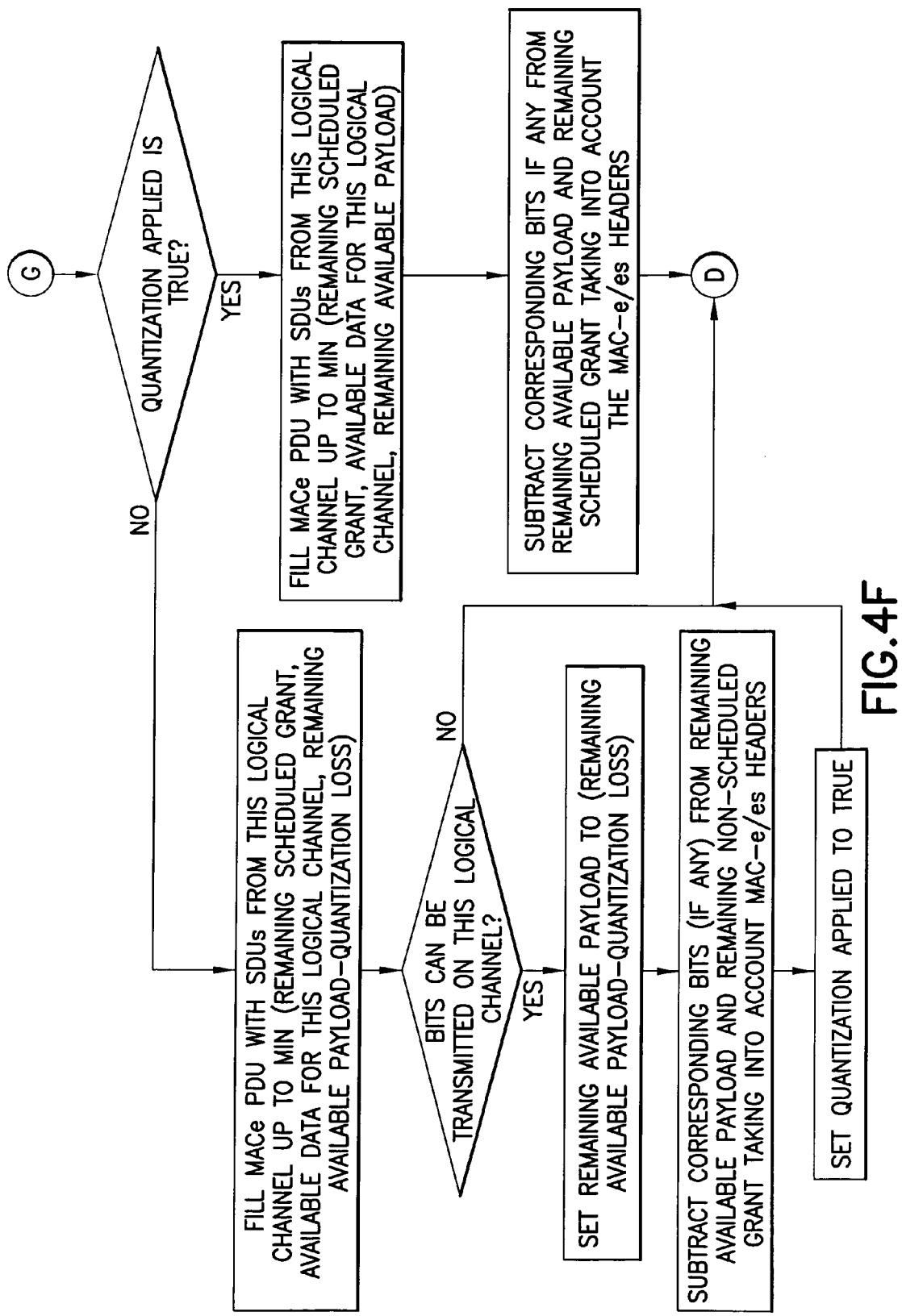
Figure 4G:
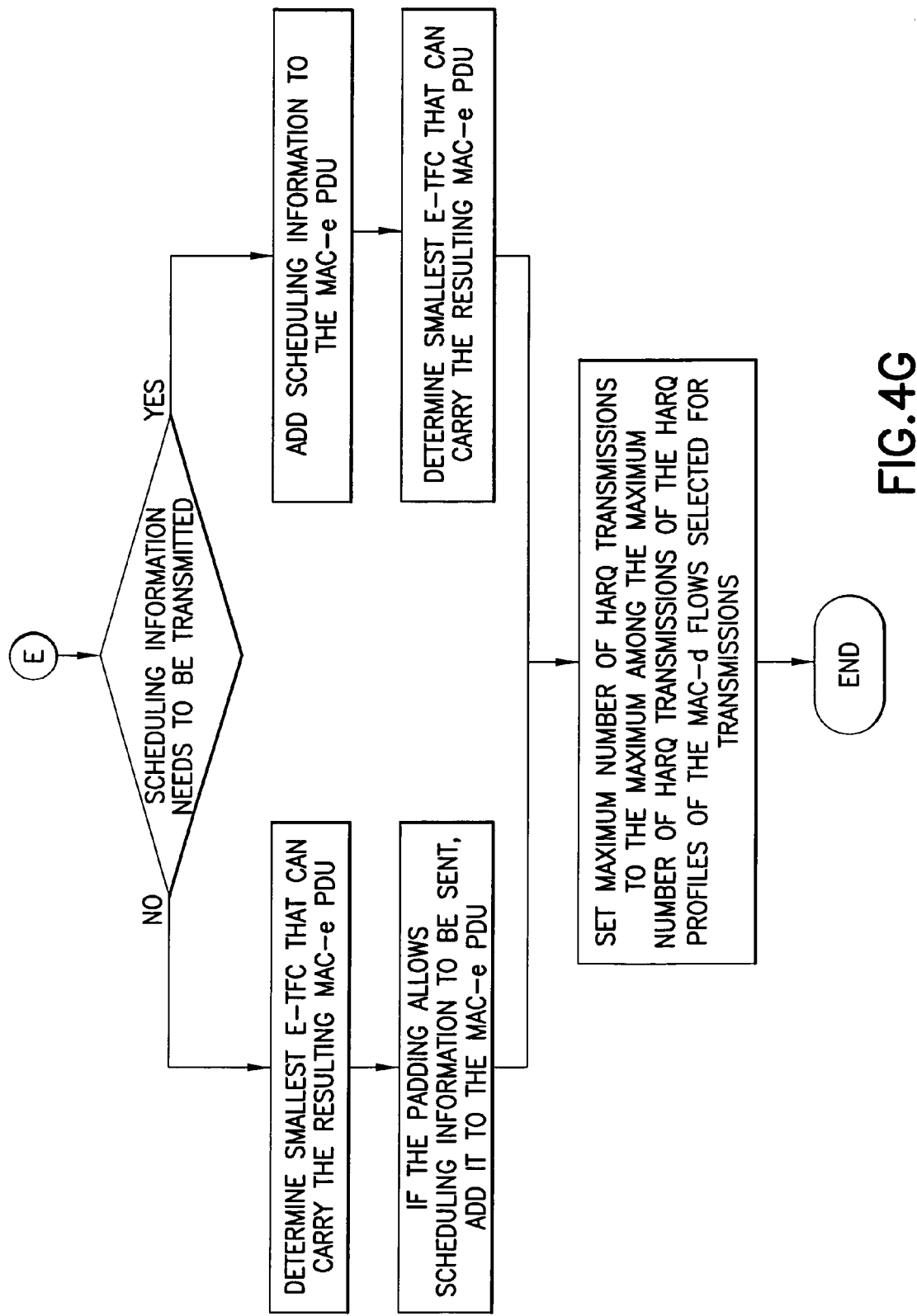

FIGS. 3A-3C are diagrams of exemplary E-DCH (Enhanced Dedicated Transport Channel) transport format combination selections, according to various exemplary embodiments of the invention. The non-limiting examples show a case of scheduled signaling data with real-time VoIP and a background packet data (FIGS. 3A, 3B), and a case of non-scheduled signaling data with real-time VoIP and a background packet data (FIGS. 3C). The 10 ms TTI is assumed for convenience, and not by way of limitation. Also, the use of radio block (Rb) 1 to carry the signaling data, Rb 2 to carry the VoIP data, and RB 3 to carry the packet data is not to be construed as a limitation upon the use and practice of the exemplary embodiments of this invention.

The following pseudo-code for the E-TFC selection function describes processes including the quantization of grants, and data multiplexing, according to various exemplary embodiments of the invention. This embodiment provides an improved and simpler implementation than a conventional implementation. FIGS. 4A-4G illustrate in flowchart form the behavior described in the pseudo-code that follows. Note that the pseudo-code (meant to be merely informative) could be written in a number of different ways, and that the following specific form thereof should not be construed to impose any limitations on the exemplary embodiments of the invention.

Pseudo-Code for E-TFC Selection

The following exemplary pseudo-code below describes one possible implementation of the E-TFC Selection:

```
1> determine whether to take the scheduled and non-scheduled grants into account in the
   upcoming transmission.
1>     if scheduled and/or non-scheduled data can be transmitted:
       2> select a MAC-d flow that allows highest-priority data to be transmitted (when
          more than one MAC-d flow allows data of the same highest priority to be
          transmitted, it is left to implementation to select which MAC-d flow to prefer);
       2> identify the MAC-d flow(s) whose multiplexing lists allow them to be
          transmitted in the same TTI as this MAC-d flow, and whose grants allow them to
          transmit in this TTI and ignore the one(s) that cannot.
       2> based on the HARQ profile of this MAC-d flow, identify the power offset to
          use;
       2> based on this power offset and the E-TFC restriction procedure, determine the
          "Maximum Supported Payload" (i.e., maximum MAC-e PDU size or E-TFC that
          can be sent by the UE during the upcoming transmission);
       2> if the upcoming transmission overlaps with a compressed mode gap on 10ms
          TTI, scale down the current serving grant (SG);
       2> set "Remaining Scheduled Grant" to the highest payload that could be
          transmitted according to SG and selected power offset;
       2> for each MAC-d flow with a non-scheduled grant, set the "Remaining
          Non-scheduled Grant" to the value of the grant;
       2> if Scheduling Information needs to be transmitted:
              3> set "Total Granted Payload" to the sum of "Remaining Non Scheduled
                 Grant" for all non-scheduled MAC-d flows + "Remaining Scheduled
                 Grant" + size of the scheduling information
       2> Else
              3> Set "Total Granted Payload" to the sum of "Remaining Non Scheduled
                 Grant" for all non-scheduled MAC-d flows, plus "Remaining Scheduled
                 Grant".
       2> Set "Remaining Available Payload" to MIN ("Max Supported Payload", "Total
          Granted Payload")
       2> Set "Quantization Loss" to the value of "Remaining Available Payload" "
          ("Remaining Available Payload" rounded down to the next smaller E-TFC)
       2> If scheduling information needs to be transmitted
              3> Subtract the size of scheduling information from "Remaining
                 Available Payload"
       2> Set "Quantization Applied" to FALSE
       2> perform the following loop for each logical channel, in the order of their
```

```
priorities:
    3> if this logical channel belongs to a MAC-d flow with a non-scheduled
    grant, then:
        4> consider the "Remaining Non-scheduled Grant" corresponding
        to the MAC-d flow on which this logical channel is mapped;
        4> fill the MAC-e PDU with SDU(s) from this logical channel up
        to MIN ("Remaining Non-scheduled Grant", Available Data for
        this logical channel, "Remaining Available Payload" taking into
        account the MAC-e/es headers);
        4> subtract the corresponding bits if any from "Remaining
        Available Payload" and "Remaining Non-scheduled Grant" taking
        into account the MAC-e/es headers.
    3> else:
        4> If "Quantization Applied" is TRUE
            5>    fill the MACe PDU with SDU(s) from this logical
            channel up to MIN ("Remaining Scheduled Grant
            Payload" taking into account the MAC-e/es headers,
            Available Data for this logical channel, "Remaining
            Available Payload" taking into account the MAC-e/es
            headers);
            5> subtract the corresponding bits if any from "Remaining
            Available Payload" and "Remaining Scheduled Grant"
            taking into account the MAC-e/es headers.
        4> else:
            5> fill the MAC-e PDU with SDU(s) from this logical
            channel up to MIN ("Remaining Scheduled Grant",
            Available Data for this logical channel, "Remaining
            Available Payload" – "Quantization Loss");
            5> If bits can be transmitted on this logical channel
                6>    set "Remaining Available Payload" to
                ("Remaining Available Payload"– "Quantization
                Loss")
                6>    subtract the corresponding bits from
                "Remaining Available Payload" and "Remaining
                Scheduled Grant" taking into account the
                MAC-e/es headers.
                6> set "Quantization Applied" to TRUE
    2> if Scheduling Information needs to be transmitted:
        3> add Scheduling Information to the MAC-e PDU;
        3> determine the smallest E-TFC that can carry the resulting MAC-e
        PDU;
        3>    if the padding allows a $DDI_0$ to be sent, add it to the end of the
        MAC-e header.
    2> else:
        3> determine the smallest E-TFC that can carry the resulting MAC-e
        PDU;
        3> if the padding allows a Scheduling Information to be sent, add it to the
        MAC-e PDU;
        3>    if a Scheduling Information was added to the PDU and if the
        padding allows a $DDI_0$ to be sent, add it to the end of the MAC-e header.
    2> set the maximum number of HARQ transmissions to the maximum among the
    maximum number of HARQ transmissions of the HARQ profiles of the MAC-d
    flows selected for transmissions.
1> else if Scheduling Information needs to be transmitted:
    2> select the "control-only" HARQ profile;
    2> fill the MAC-e PDU with the scheduling information;
    2> select the smallest E-TFC.
```

In the described embodiments the priority of the data as configured by the network is guaranteed, as opposed to conventional practice where the priority of the data is not guaranteed. This means, for example, that the higher priority signaling mapped on scheduled data will have a guaranteed and punctual transmission.

In one exemplary embodiment, one or more data frames carrying lower priority non-scheduled data can be either delayed or ultimately discarded to allow higher priority scheduled data to be transmitted in that TTI. In many typical scenarios this occurrence may be seen as an acceptable trade-off.

In another exemplary embodiment, data frames carrying lower priority non-scheduled data are not discarded due to quantization (with a possible small increase in noise due to occasional punctual extra power transmitted by the UE).

According to exemplary embodiments, a method, apparatus and a computer program operate to select a transport format combination to maximize size of the transport format combination based at least on one of a non-scheduled grant and a scheduled grant, wherein the transport format combination preserves transmission of high priority data by, if necessary, quantizing lower priority data.

According to one aspect of the exemplary embodiments, the transport format combination provides an enhanced dedicated transport channel (E-DCH) data transmission. The data are associated with a MAC-d flow.

According to one aspect of the exemplary embodiments, the data are multiplexed in a MAC protocol data unit for transmission according to the selected transport format combination.

According to another aspect of the exemplary embodiments, if the transmission contains any scheduled data, the size of the MAC protocol data unit does not exceed the total of non-scheduled grants within a particular transmission time interval (TTI), the maximum number of scheduled bits based on a serving grant after adjustment of compressed frames and power offset, and the size of a triggered scheduling information.

According to another aspect of the exemplary embodiments, the data transmissions are over a Third Generation Partnership Project (3GPP) network.

According to an exemplary embodiment, a method further comprises selecting a transport format combination based at least on one of a non-scheduled grant and a scheduled grant according to one or more restrictions, wherein the selected transport format combination respects the priority of the data to be transmitted. The method further comprises selectively restricting the transmission of lower priority data.

According to one aspect of the exemplary embodiment, the transport format combination provides an enhanced dedicated transport channel (E-DCH) data transmission. The data are associated with one or more MAC-d flow.

According to one aspect of the exemplary embodiment, the data are multiplexed in a MAC or MAC-e protocol data unit for transmission according to the selected transport format combination.

It should be noted that the exemplary embodiments of this invention are applicable for use with both of a power limited and a non-power limited condition of the UE 10.

Based on the foregoing it should be apparent that the exemplary embodiments of this invention provide a method, apparatus and computer program(s) to perform transport format combination selection so as to maximize transmission of higher priority data. Referring to 5, at Block 5A, when scheduled and/or non-scheduled grants are taken into account for a transmission time interval, there is a step of giving data of a given priority belonging to a scheduled MAC-d flow precedence over any lower priority data, whether belonging to a scheduled or a non-scheduled MAC-d flow; and at Block 5B there is a step of giving data of a given priority belonging to a non-scheduled MAC-d flow precedence over any lower priority data, whether belonging to a scheduled or a non-scheduled MAC-d flow. In this method, if the transmission contains any scheduled data, at the step shown in Block 5C the size of a selected MAC-e protocol data unit is made not to exceed the total of all non-scheduled grants which are applicable for transmission in the transmission time interval; a maximum number of scheduled bits based on a serving grant, after adjustment for compressed frames, and a power offset; and the size of triggered scheduling information, if any.

The method, apparatus and computer program(s) of the preceding paragraph, where the power offset is from a selected HARQ profile.

The method, apparatus and computer program(s) of the preceding paragraphs, where the transmission time interval is equal to 10 ms.

The method, apparatus and computer program(s) of the preceding paragraphs, where the transmission time interval is equal to 2 ms.

The method, apparatus and computer program(s) of the preceding paragraphs, performed in and embodied as a user equipment operating in a universal mobile telecommunication system terrestrial radio access network.

The method of the preceding paragraphs, performed as a result of execution of computer program instructions stored in a memory medium that comprises part of a user equipment configured to operate in a universal mobile telecommunication system terrestrial radio access network.

Figure 5:
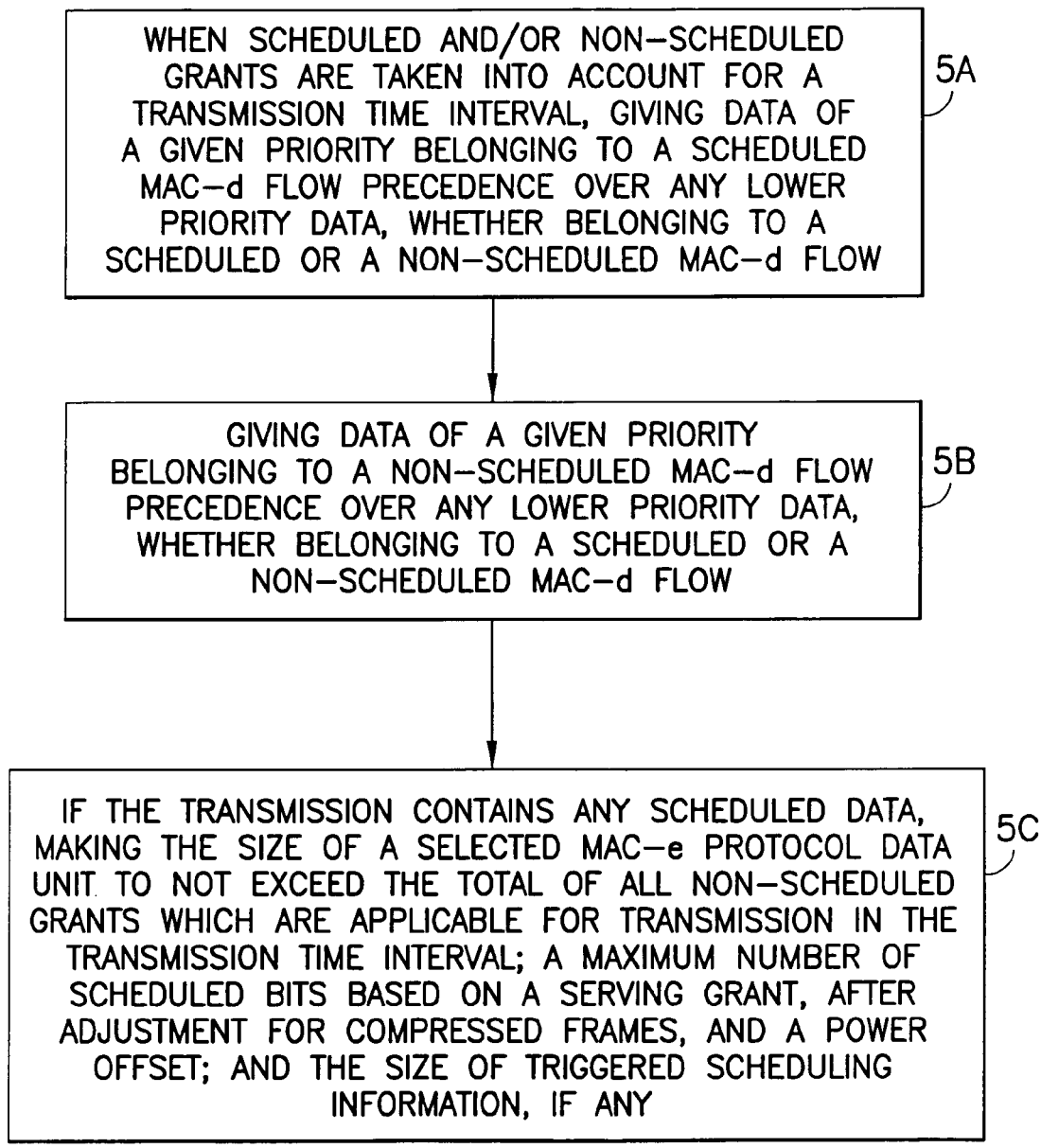
FIG. 5 is a logic flow diagram that illustrates the operation of a method, and a result of execution of computer program instructions, in accordance with the exemplary embodiments of this invention.

The various blocks shown in FIG. 5 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. As such, it should be appreciated that the processes providing selection of the transport format combination may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. For example, some aspects may be implemented in hardware, while other aspects may be implemented in firmware or software which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the UTRAN system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
performing, by a controller of an apparatus, transport format combination selection; and
outputting, by the controller, a result from the transport format combination selection,
wherein only if a transmission includes any scheduled data, a selected medium access control protocol data unit size is constrained by the controller such that the size does not exceed a total of:
all non-scheduled grants which are applicable for transmission in a transmission time interval;
a maximum number of scheduled bits based on a serving grant, after adjustment for compressed frames, and a power offset; and
triggered scheduling information size, if triggered scheduling information is to be included in the transmission.

2. The method of claim 1, performed as a result of execution of computer program instructions stored in a non-transitory computer-readable memory medium that comprises part of a user equipment.

3. The method of claim 1, wherein the constraint affects the amount of non-scheduled data in the transmission, or the amount of scheduled data in the transmission, or both, depending on the given relative priorities.

4. The method of claim 1, wherein the transport format combination selection is performed for an Enhanced Dedicated Channel transport channel.

5. The method of claim 1, wherein the power offset is from a selected hybrid automatic repeat request profile.

6. An apparatus, comprising:
a controller device configured to perform transport format combination selection; and an output configured to output a result from the controller device performing transport format combination selection,
wherein said controller device is further configured, only if a transmission contains any scheduled data, to constrain a size of a selected medium access control protocol data unit so as not to exceed a total of:
all non-scheduled grants which are applicable for transmission in a transmission time interval;
a maximum number of scheduled bits based on a serving grant, after adjustment for compressed frames, and a power offset;
and a size of triggered scheduling information, if triggered scheduling information is to be included in the transmission.

7. The apparatus of claim 6, said controller device operable as a result of execution of computer program instructions stored in a non-transitory computer-readable memory medium that comprises part of a user equipment.

8. The apparatus of claim 6, wherein:
said controller device being further configured, if grants are taken into account for the transmission time interval, to give data of a given priority belonging to a scheduled MAC d flow precedence over any lower priority data, whether belonging to a scheduled or a non scheduled MAC d flow; and to give data of a given priority belonging to a non scheduled MAC d flow precedence over any lower priority data, whether belonging to a scheduled or a non scheduled MAC d flow.

9. The apparatus of claim 6, wherein the controller device action affects the amount of non-scheduled data in the transmission, or the amount of scheduled data in the transmission, or both, depending on the given relative priorities.

10. The apparatus of claim 6, wherein the transport format combination selection is performed for an Enhanced Dedicated Channel transport channel.

11. The apparatus of claim 6, wherein the power offset is from a selected hybrid automatic repeat request profile.

12. An apparatus, comprising:
means for performing transport format combination selection; and
means for outputting a result from the transport format combination selection,
wherein only if a transmission contains any scheduled data, a size of a selected medium access control protocol data unit is constrained by the means for performing transport format combination selection so as not to exceed a total of:
all non-scheduled grants which are applicable for transmission in a transmission time interval;
a maximum number of scheduled bits based on a serving grant, after adjustment for compressed frames, and a power offset; and
a size of triggered scheduling information, if triggered scheduling information is to be included in the transmission.

13. The apparatus of claim 12, embodied at least partially as a data processor configured to execute computer program instructions stored in a non-transitory computer-readable memory medium that comprises part of a user equipment.

14. The apparatus of claim 12, embodied at least partially in at least one integrated circuit.

15. The apparatus of claim 12, further comprising:
performing means such that if grants are taken into account for a transmission time interval, to give data of a given priority belonging to a scheduled MAC d flow precedence over any lower priority data, whether belonging to a scheduled or a non scheduled MAC d flow and for giving data of a given priority belonging to a non scheduled MAC d flow precedence over any lower priority data, whether belonging to a scheduled or a non scheduled MAC d flow.

16. The apparatus of claim 12, wherein said performing means affects the amount of non-scheduled data in the transmission, or the amount of scheduled data in the transmission, or both, depending on the given relative priorities.

17. The apparatus of claim 12, wherein the transport format combination selection is performed for an Enhanced Dedicated Channel transport channel.

18. The apparatus of claim 12, wherein the power offset is from a selected hybrid automatic repeat request profile.

19. A non-transitory computer-readable memory medium storing computer program instructions, the execution of which results in operations that comprise:
performing transport format combination selection; and
outputting a result from the transport format combination selection,
wherein only if a transmission contains any scheduled data, a size of a selected medium access control protocol data unit is constrained by the transport format combination selection so as not exceed a total of:
all non-scheduled grants which are applicable for transmission in a transmission time interval;
a maximum number of scheduled bits based on a serving grant, after adjustment for compressed frames, and a power offset; and a size of triggered scheduling information, if triggered scheduling information is to be included in the transmission.

20. The method of claim 1, further comprising:

if grants are taken into account for the transmission time interval, giving data of a given priority belonging to a scheduled MAC-d flow precedence over any lower priority data, whether belonging to a scheduled or a non-scheduled MAC-d flow; and giving data of a given priority belonging to a non-scheduled MAC-d flow precedence over any lower priority data, whether belonging to a scheduled or a non-scheduled MAC-d flow.

21. The non-transitory computer-readable memory medium of claim 19, wherein execution of the computer program instructions results in further operations comprising:

such that if grants are taken into account for the transmission time interval, giving data of a given priority belonging to a scheduled MAC d flow precedence over any lower priority data, whether belonging to a scheduled or a non scheduled MAC d flow; and giving data of a given priority belonging to a non scheduled MAC d flow precedence over any lower priority data, whether belonging to a scheduled or a non scheduled MAC d flow.

22. The non-transitory computer-readable memory medium of claim 19, wherein the power offset is from a selected hybrid automatic repeat request profile.

* * * * *